United States Patent
Chan et al.

(10) Patent No.: US 10,377,108 B2
(45) Date of Patent: Aug. 13, 2019

(54) GYPSUM PRODUCTS WITH HIGH EFFICIENCY HEAT SINK ADDITIVES

(71) Applicant: United States Gypsum Company, Chicago, IL (US)

(72) Inventors: Cesar Chan, Libertyville, IL (US); Weixin D. Song, Vernon Hills, IL (US); Bangji Cao, Naperville, IL (US); Guy Rosenthal, Wheaton, IL (US); Qiang Yu, Grayslake, IL (US); Srinivas Veeramasuneni, Round Lake, IL (US)

(*) Notice: Subject to any disclaimer, the term of this patent is extended or adjusted under 35 U.S.C. 154(b) by 256 days.

(21) Appl. No.: 13/766,181

(22) Filed: Feb. 13, 2013

(65) Prior Publication Data

US 2013/0216762 A1 Aug. 22, 2013

Related U.S. Application Data

(60) Provisional application No. 61/600,574, filed on Feb. 17, 2012.

(51) Int. Cl.
| | |
|---|---|
| *B32B 13/08* | (2006.01) |
| *B32B 13/04* | (2006.01) |
| *C04B 28/14* | (2006.01) |
| *D21H 21/16* | (2006.01) |
| *D21H 21/34* | (2006.01) |
| *C04B 111/00* | (2006.01) |
| *C04B 111/28* | (2006.01) |

(52) U.S. Cl.
CPC ............ *B32B 13/08* (2013.01); *B32B 13/04* (2013.01); *C04B 28/14* (2013.01); *D21H 21/16* (2013.01); *D21H 21/34* (2013.01); *C04B 2111/0062* (2013.01); *C04B 2111/28* (2013.01); *Y10T 428/232* (2015.01)

(58) Field of Classification Search
CPC ..... Y10T 428/232; B32B 13/08; B32B 13/04; C04B 28/14–148
See application file for complete search history.

(56) References Cited

U.S. PATENT DOCUMENTS

| | | |
|---|---|---|
| 1,769,519 A | 7/1930 | King et al. |
| 1,971,900 A | 8/1934 | Cerveny et al. |
| 2,078,199 A | 10/1936 | King |

(Continued)

FOREIGN PATENT DOCUMENTS

| | | |
|---|---|---|
| AT | 406048 | 1/2000 |
| AU | 199924233 | 6/1999 |

(Continued)

OTHER PUBLICATIONS

Machine translation of JP 2003/073178 A, obtained from Industrial Property Digital Library service of JPO; retrieved on Mar. 24, 2014.*

(Continued)

*Primary Examiner* — Z. Jim Yang
(74) *Attorney, Agent, or Firm* — Greer, Burns & Crain, Ltd.; Pradip Sahu; Philip T. Petti

(57) ABSTRACT

Disclosed herein are gypsum products with at least one high efficiency heat sink additive. The gypsum products, e.g., gypsum panels, are less susceptible to the damaging effects of extreme heat as the temperature rises due to the presence of the at least one additive.

10 Claims, 12 Drawing Sheets

TABLE IIa:
High Temperature Thermal Insulation Index Testing of Specimens from Laboratory Samples Referenced in Example 2A

| Sample | Approx. Ave. Board Density (pcf) (kg/m³) | Approx. High Expan. Vermiculite (% by weight of Stucco) | Stucco (lbs/MSF) (kg/m²) | Approx. ATH (% by weight of Stucco) | ATH (lbs/MSF) (g/m²) | Avg. Thermal Insulation Index (TI) (mins. from 40°C to 200°C) | Stucco Diff. (lbs/MSF) (g/m²) | TI Change |
|---|---|---|---|---|---|---|---|---|
| 1 | 29.8 (477.5) | 0% | 1250 (6.11) | 0% | 0 | 22.6 | 0 | 0 |
| 2 | 30.5 (488.7) | 0% | 1230 (6.01) | 4% | 49 (239.3) | 23.5 | -20 (-97.7) | 0.9 |

(56) References Cited

U.S. PATENT DOCUMENTS

| | | | |
|---|---|---|---|
| 2,083,961 A | 6/1937 | Gustave | |
| 2,213,603 A | 9/1940 | Young et al. | |
| 2,322,194 A | 6/1943 | King | |
| 2,340,535 A | 2/1944 | Jenkins | |
| 2,342,574 A | 2/1944 | Denning | |
| 2,526,066 A | 10/1950 | Croce | |
| 2,744,022 A | 5/1956 | Croce | |
| 3,454,456 A | 7/1969 | Willey | |
| 3,513,090 A | 5/1970 | Sauer et al. | |
| 3,573,947 A | 4/1971 | Kinkade et al. | |
| 3,616,173 A | 10/1971 | Green et al. | |
| 3,719,513 A | 3/1973 | Bragg et al. | |
| 3,741,929 A | 6/1973 | Burton | |
| 3,830,687 A * | 8/1974 | Re | B28B 11/04 |
| | | | 428/70 |
| 3,839,059 A | 10/1974 | Rothfelder et al. | |
| 3,908,062 A | 9/1975 | Roberts | |
| 3,964,944 A * | 6/1976 | Gwynne | E04C 2/043 |
| | | | 156/40 |
| 4,064,317 A * | 12/1977 | Fukuba | B32B 13/08 |
| | | | 252/602 |
| 4,130,458 A | 12/1978 | Moore et al. | |
| 4,159,302 A * | 6/1979 | Greve | C04B 28/14 |
| | | | 264/333 |
| 4,190,547 A | 2/1980 | Mahnke et al. | |
| 4,311,554 A | 1/1982 | Herr | |
| 4,327,146 A * | 4/1982 | White | B28B 1/50 |
| | | | 428/308.8 |
| 4,328,178 A | 5/1982 | Kossatz | |
| 4,343,127 A | 8/1982 | Greve et al. | |
| 4,352,719 A | 10/1982 | Herr | |
| 4,372,814 A * | 2/1983 | Johnstone | D21H 11/04 |
| | | | 162/124 |
| 4,374,171 A * | 2/1983 | McCarter | C08K 3/06 |
| | | | 428/361 |
| 4,394,411 A | 7/1983 | Krull et al. | |
| 4,564,544 A | 1/1986 | Burkard et al. | |
| 4,572,862 A * | 2/1986 | Ellis | C04B 28/02 |
| | | | 106/686 |
| 4,600,634 A | 7/1986 | Langer | |
| 4,664,707 A | 5/1987 | Wilson et al. | |
| 4,676,835 A | 6/1987 | Green et al. | |
| 4,722,858 A | 2/1988 | Harbourne et al. | |
| 4,729,853 A | 3/1988 | von Bonin | |
| 4,748,771 A | 6/1988 | Lehnert et al. | |
| 4,784,897 A | 11/1988 | Brands et al. | |
| 4,939,192 A | 7/1990 | T'sas | |
| 5,001,005 A | 3/1991 | Blanpied | |
| 5,041,333 A * | 8/1991 | Conroy | B28B 1/52 |
| | | | 106/711 |
| 5,148,645 A * | 9/1992 | Lehnert | B28B 11/04 |
| | | | 156/42 |
| 5,154,874 A | 10/1992 | Koslowski | |
| 5,155,959 A | 10/1992 | Richards et al. | |
| 5,158,612 A | 10/1992 | Savoly et al. | |
| 5,171,366 A | 12/1992 | Richards et al. | |
| 5,240,639 A | 8/1993 | Diez et al. | |
| 5,250,153 A | 10/1993 | Izard et al. | |
| 5,264,057 A | 11/1993 | Schlatter et al. | |
| 5,320,677 A | 6/1994 | Baig | |
| 5,401,588 A * | 3/1995 | Garvey | C04B 14/38 |
| | | | 428/172 |
| 5,580,637 A * | 12/1996 | Konta | B32B 5/18 |
| | | | 428/138 |
| 5,631,097 A * | 5/1997 | Andersen | B28B 1/00 |
| | | | 428/220 |
| 5,643,510 A | 7/1997 | Sucech | |
| 5,683,635 A | 11/1997 | Sucech et al. | |
| 5,685,903 A | 11/1997 | Stav et al. | |
| 5,704,179 A | 1/1998 | Lehnert et al. | |
| 5,714,001 A | 2/1998 | Savoly et al. | |
| 5,798,425 A | 8/1998 | Albrecht et al. | |
| 5,817,262 A | 10/1998 | Englert et al. | |
| 5,839,716 A | 11/1998 | Marrel | |
| 5,858,083 A | 1/1999 | Stave et al. | |
| 5,871,857 A | 2/1999 | Alhamad | |
| 5,911,818 A | 6/1999 | Baig | |
| 5,958,131 A | 9/1999 | Asbridge et al. | |
| 5,962,119 A | 10/1999 | Chan | |
| 6,010,596 A | 1/2000 | Song | |
| 6,102,995 A | 8/2000 | Hutchings et al. | |
| 6,162,288 A | 12/2000 | Kindt et al. | |
| 6,221,521 B1 * | 4/2001 | Lynn | B32B 13/02 |
| | | | 428/703 |
| 6,228,497 B1 | 5/2001 | Dombeck | |
| 6,228,914 B1 | 5/2001 | Ford et al. | |
| 6,290,769 B1 | 9/2001 | Carkner | |
| 6,299,727 B1 * | 10/2001 | Hatanaka | B32B 29/00 |
| | | | 162/125 |
| 6,309,740 B1 | 10/2001 | Shu et al. | |
| 6,340,389 B1 | 1/2002 | Klus | |
| 6,342,284 B1 | 1/2002 | Yu et al. | |
| 6,387,172 B1 | 5/2002 | Yu et al. | |
| 6,389,864 B1 | 5/2002 | Chubb et al. | |
| 6,394,279 B1 | 5/2002 | Doelle et al. | |
| 6,395,131 B1 | 5/2002 | Doelle et al. | |
| 6,406,537 B1 | 6/2002 | Immordino | |
| 6,409,819 B1 | 6/2002 | Ko | |
| 6,409,824 B1 | 6/2002 | Veeramasuneni et al. | |
| 6,409,825 B1 | 6/2002 | Yu et al. | |
| 6,425,982 B1 | 7/2002 | Cao et al. | |
| 6,481,171 B2 * | 11/2002 | Yu | C04B 28/147 |
| | | | 52/443 |
| 6,494,609 B1 | 12/2002 | Wittbold et al. | |
| 6,508,895 B2 * | 1/2003 | Lynn | B28B 1/522 |
| | | | 156/39 |
| 6,572,698 B1 | 6/2003 | Ko | |
| 6,589,389 B2 | 7/2003 | Cao et al. | |
| 6,632,550 B1 | 10/2003 | Yu et al. | |
| 6,641,658 B1 | 11/2003 | Dubey | |
| 6,689,474 B2 | 2/2004 | Pickett et al. | |
| 6,699,364 B2 | 3/2004 | Song et al. | |
| 6,746,781 B2 | 6/2004 | Francis et al. | |
| 6,752,895 B1 | 6/2004 | Song et al. | |
| 6,773,639 B2 | 8/2004 | Moyes et al. | |
| 6,774,146 B2 | 8/2004 | Savoly et al. | |
| 6,777,517 B1 | 8/2004 | Albrecht et al. | |
| 6,800,131 B2 | 10/2004 | Yu et al. | |
| 6,805,741 B1 | 10/2004 | Liu et al. | |
| 6,808,793 B2 | 10/2004 | Randall et al. | |
| 6,815,049 B2 | 11/2004 | Veeramasuneni et al. | |
| 6,831,118 B2 | 12/2004 | Munzenberger | |
| 6,832,652 B1 | 12/2004 | Dillenbeck et al. | |
| 6,874,930 B2 | 4/2005 | Wittbold et al. | |
| 6,881,247 B2 | 4/2005 | Batdorf | |
| 6,893,752 B2 | 5/2005 | Veeramasuneni et al. | |
| 6,941,720 B2 | 9/2005 | DeFord et al. | |
| 7,189,993 B2 | 3/2007 | Makimura et al. | |
| 7,364,015 B2 | 4/2008 | Englert et al. | |
| 7,364,676 B2 | 4/2008 | Sucech et al. | |
| 7,381,261 B1 | 6/2008 | Nelson | |
| 7,413,603 B2 | 8/2008 | Miller et al. | |
| 7,445,738 B2 | 11/2008 | Dubey et al. | |
| 7,455,728 B2 | 11/2008 | Losch et al. | |
| 7,563,733 B2 | 7/2009 | Ahluwalia et al. | |
| 7,568,528 B1 | 8/2009 | Miller et al. | |
| 7,635,657 B2 * | 12/2009 | Bland | E04C 2/043 |
| | | | 428/294.7 |
| 7,644,548 B2 | 1/2010 | Guevara et al. | |
| 7,653,657 B2 | 1/2010 | Sloo et al. | |
| 7,661,511 B2 * | 2/2010 | Hasegawa | E04B 9/001 |
| | | | 181/287 |
| 7,731,794 B2 | 6/2010 | Yu et al. | |
| 7,736,720 B2 | 6/2010 | Yu et al. | |
| 7,754,006 B2 | 7/2010 | Liu et al. | |
| 7,767,019 B2 | 8/2010 | Liu et al. | |
| 7,771,851 B2 | 8/2010 | Song et al. | |
| 7,776,170 B2 | 8/2010 | Yu et al. | |
| 7,803,226 B2 | 9/2010 | Wang et al. | |
| 7,803,296 B2 | 9/2010 | Miller et al. | |
| 7,811,685 B2 | 10/2010 | Wang et al. | |
| 7,815,730 B2 | 10/2010 | Wang et al. | |
| 7,841,148 B2 | 11/2010 | Tonyon et al. | |

(56) References Cited

U.S. PATENT DOCUMENTS

| | | | |
|---|---|---|---|
| 7,849,648 B2 | 12/2010 | Tonyan et al. | |
| 7,849,649 B2 | 12/2010 | Tonyon et al. | |
| 7,849,650 B2 | 12/2010 | Tonyon et al. | |
| 7,851,057 B2 | 12/2010 | Englert et al. | |
| 7,862,687 B2 | 1/2011 | Englert et al. | |
| 7,870,698 B2 | 1/2011 | Tonyon et al. | |
| 7,875,114 B2 | 1/2011 | Wittbold et al. | |
| 7,892,472 B2 | 2/2011 | Veeramasuneni et al. | |
| 7,932,195 B2 | 4/2011 | Smith et al. | |
| 7,935,223 B2 | 5/2011 | Cao et al. | |
| 7,989,370 B2 | 8/2011 | Currier et al. | |
| 8,030,229 B2 | 10/2011 | Ahluwalia et al. | |
| 8,030,377 B2 | 10/2011 | Dubey et al. | |
| 8,038,790 B1 | 10/2011 | Dubey et al. | |
| 8,057,915 B2 | 11/2011 | Song et al. | |
| 8,062,565 B2 | 11/2011 | Mueller et al. | |
| 8,062,741 B2 | 11/2011 | Tonyan et al. | |
| 8,070,876 B1* | 12/2011 | Jiang | C04B 20/1033 106/638 |
| 8,070,878 B2 | 12/2011 | Dubey | |
| 8,070,895 B2 | 12/2011 | Engbrecht et al. | |
| 8,079,198 B2 | 12/2011 | Tonyan et al. | |
| 8,088,218 B2 | 1/2012 | Blackburn et al. | |
| 8,100,226 B2 | 1/2012 | Cao et al. | |
| 8,118,928 B1 | 2/2012 | Yu et al. | |
| 8,122,679 B2 | 2/2012 | Tonyan et al. | |
| 8,133,357 B2 | 3/2012 | Cao et al. | |
| 8,133,600 B2 | 3/2012 | Wang et al. | |
| 8,197,952 B2 | 6/2012 | Yu et al. | |
| 8,257,489 B2 | 9/2012 | Yu et al. | |
| 8,262,820 B2 | 9/2012 | Yu et al. | |
| 8,323,785 B2* | 12/2012 | Yu | C04B 20/06 106/772 |
| 8,383,233 B2 | 2/2013 | Palm et al. | |
| RE44,070 E | 3/2013 | Yu et al. | |
| 8,470,461 B2* | 6/2013 | Yu | C04B 28/14 428/703 |
| 8,475,762 B2 | 7/2013 | Li et al. | |
| 8,974,925 B1 | 3/2015 | Cao et al. | |
| 2002/0009622 A1 | 1/2002 | Goodson | |
| 2002/0045074 A1 | 4/2002 | Yu et al. | |
| 2002/0096278 A1 | 7/2002 | Foster et al. | |
| 2002/0139082 A1* | 10/2002 | DeFord | E04C 2/04 52/783.1 |
| 2003/0049450 A1 | 3/2003 | Song et al. | |
| 2003/0056909 A1 | 3/2003 | Cao et al. | |
| 2003/0084980 A1 | 5/2003 | Seufert et al. | |
| 2003/0089061 A1 | 5/2003 | DeFord et al. | |
| 2003/0138614 A1* | 7/2003 | Leclercq | C04B 14/10 428/292.1 |
| 2003/0175478 A1 | 9/2003 | Leclercq et al. | |
| 2003/0211305 A1* | 11/2003 | Koval | B28B 19/0092 428/292.4 |
| 2004/0026002 A1 | 2/2004 | Weldon et al. | |
| 2004/0038065 A1* | 2/2004 | Francis | B32B 13/04 428/537.7 |
| 2004/0121075 A1 | 6/2004 | Grove et al. | |
| 2004/0121152 A1 | 6/2004 | Toas | |
| 2004/0231916 A1 | 11/2004 | Englert et al. | |
| 2005/0019618 A1 | 1/2005 | Yu et al. | |
| 2005/0219938 A1 | 10/2005 | Rigaudon et al. | |
| 2005/0223947 A1* | 10/2005 | Huang | B05D 1/18 106/481 |
| 2005/0241541 A1 | 11/2005 | Honn et al. | |
| 2005/0263925 A1 | 12/2005 | Heseltine et al. | |
| 2005/0281999 A1 | 12/2005 | Hoffmann et al. | |
| 2006/0068186 A1* | 3/2006 | Leclercq | B32B 5/022 428/294.7 |
| 2006/0090674 A1 | 5/2006 | Fukuda et al. | |
| 2006/0162839 A1* | 7/2006 | Seki | C04B 28/14 156/39 |
| 2006/0278132 A1 | 12/2006 | Yu et al. | |
| 2006/0278133 A1* | 12/2006 | Yu | C04B 28/14 106/772 |
| 2007/0048490 A1* | 3/2007 | Yu | B32B 13/02 428/70 |
| 2007/0059513 A1* | 3/2007 | Yu | B32B 13/02 428/304.4 |
| 2007/0068424 A1 | 3/2007 | Fornatora et al. | |
| 2007/0197114 A1 | 8/2007 | Grove | |
| 2007/0220824 A1* | 9/2007 | Hasegawa | E04B 9/001 52/506.05 |
| 2007/0255032 A1 | 11/2007 | Bichler et al. | |
| 2007/0277948 A1 | 12/2007 | Carbo et al. | |
| 2008/0060316 A1 | 3/2008 | Fukuda et al. | |
| 2008/0066651 A1 | 3/2008 | Park | |
| 2008/0070026 A1 | 3/2008 | Yu et al. | |
| 2008/0090068 A1 | 4/2008 | Yu | |
| 2008/0152945 A1 | 6/2008 | Miller et al. | |
| 2008/0160294 A1* | 7/2008 | Baig | B32B 13/02 428/332 |
| 2008/0190062 A1 | 8/2008 | Engbrecht et al. | |
| 2008/0202415 A1 | 8/2008 | Miller et al. | |
| 2008/0227891 A1 | 9/2008 | Jarvie et al. | |
| 2008/0245012 A1 | 10/2008 | Boisvert et al. | |
| 2008/0305252 A1 | 12/2008 | Cimaglio et al. | |
| 2009/0029141 A1 | 1/2009 | Shake et al. | |
| 2009/0126300 A1 | 5/2009 | Fuijware et al. | |
| 2009/0151602 A1 | 6/2009 | Francis | |
| 2009/0162602 A1 | 6/2009 | Cottier et al. | |
| 2009/0208714 A1* | 8/2009 | Currier | B28B 1/52 428/212 |
| 2009/0239977 A1 | 9/2009 | Dubey et al. | |
| 2009/0252941 A1 | 10/2009 | Mueller et al. | |
| 2009/0253323 A1 | 10/2009 | Mueller et al. | |
| 2009/0260918 A1 | 10/2009 | Cao et al. | |
| 2010/0031853 A1 | 2/2010 | Visocekas et al. | |
| 2010/0075167 A1* | 3/2010 | Gilley | B28B 19/0092 428/532 |
| 2010/0088984 A1 | 4/2010 | Guevara et al. | |
| 2010/0136269 A1 | 6/2010 | Andersen et al. | |
| 2010/0143682 A1 | 6/2010 | Shake et al. | |
| 2010/0197182 A1 | 8/2010 | Barziali | |
| 2010/0229714 A1 | 9/2010 | Tonyan et al. | |
| 2010/0239886 A1 | 9/2010 | Yu et al. | |
| 2010/0247937 A1 | 9/2010 | Liu et al. | |
| 2010/0291305 A1 | 11/2010 | Wittbold et al. | |
| 2010/0304078 A1* | 12/2010 | Stol | A62C 2/065 428/98 |
| 2010/0320029 A1 | 12/2010 | Cao et al. | |
| 2011/0054053 A1 | 3/2011 | Lee et al. | |
| 2011/0147119 A1 | 6/2011 | Cao et al. | |
| 2011/0195241 A1 | 8/2011 | Yu et al. | |
| 2011/0319543 A1 | 12/2011 | Carbo et al. | |
| 2012/0024625 A1 | 2/2012 | Cao et al. | |
| 2012/0034441 A1* | 2/2012 | Adzima | C04B 14/42 428/219 |
| 2012/0164422 A1 | 6/2012 | Palm et al. | |
| 2012/0168527 A1 | 7/2012 | Li et al. | |
| 2012/0170403 A1 | 7/2012 | Li et al. | |
| 2012/0219785 A1* | 8/2012 | Yu | C04B 20/06 428/312.4 |
| 2012/0308463 A1 | 12/2012 | Li et al. | |
| 2013/0023612 A1 | 1/2013 | Lu et al. | |
| 2013/0068364 A1 | 3/2013 | Yu et al. | |
| 2013/0074737 A1* | 3/2013 | Samanta | C04B 28/14 106/680 |
| 2013/0081554 A1 | 4/2013 | Cao | |
| 2013/0098268 A1 | 4/2013 | Li et al. | |
| 2013/0099027 A1 | 4/2013 | Li et al. | |
| 2013/0099418 A1 | 4/2013 | Li et al. | |
| 2013/0100759 A1 | 4/2013 | Wittbold et al. | |
| 2013/0101838 A1* | 4/2013 | Yu | C04B 20/06 428/340 |
| 2013/0216762 A1 | 8/2013 | Chan et al. | |
| 2013/0292077 A1* | 11/2013 | Baroux | B32B 5/26 162/159 |
| 2014/0020603 A1* | 1/2014 | Barger | C04B 28/14 106/461 |

(56) References Cited

U.S. PATENT DOCUMENTS

2015/0158766 A1* 6/2015 Teng .................... C04B 28/145
106/687

FOREIGN PATENT DOCUMENTS

| | | |
|---|---|---|
| CN | 1238312 | 12/1999 |
| CN | 1396138 | 2/2003 |
| DE | 4316518 | 11/1994 |
| EP | 258064 | 3/1988 |
| EP | 335405 | 10/1989 |
| EP | 1008568 | 6/2000 |
| FR | 2673620 | 9/1992 |
| GB | 1242697 | 8/1971 |
| JP | 56017963 | 2/1981 |
| JP | 58-111240 | 7/1983 |
| JP | S59-071498 A * | 4/1984 |
| JP | 01132899 A * | 5/1989 |
| JP | 07330410 | 12/1995 |
| JP | 07330411 | 12/1995 |
| JP | 08042098 | 2/1996 |
| JP | 09142915 | 6/1997 |
| JP | 2000352147 | 12/2000 |
| JP | 2002-154812 A | 5/2002 |
| JP | 2002154812 | 5/2002 |
| JP | 2003073178 A * | 3/2003 |
| JP | 2004-122722 | 4/2004 |
| JP | 2010-540400 | 12/2010 |
| KZ | 15821 | 6/2005 |
| KZ | 23200 | 6/2010 |
| RU | 2345189 | 1/2008 |
| SU | 887506 | 12/1981 |
| SU | 1399289 | 5/1988 |
| WO | 126524 | 2/1973 |
| WO | 1990016984 | 4/1999 |
| WO | 1998042632 | 10/1999 |
| WO | 0206605 A1 | 1/2002 |
| WO | 2004101699 A1 | 11/2004 |
| WO | 2005061793 A1 | 7/2005 |
| WO | 2009007971 | 1/2009 |
| WO | 2009111844 | 9/2009 |
| WO | 2010106444 | 9/2010 |
| WO | 2012/116325 | 8/2012 |

OTHER PUBLICATIONS

Partial translation of JP 2003/073178A. Furnished by staff translator of the PTO; obtained on Aug. 8, 2014.*
Product information on Aluminum oxide hydrated (product # 11037) from Sigma-Aldrich. Retrieved on Dec. 8, 2014 from website of Sigma-Aldrich.*
Partial translation of JP 2003/073178A. Furnished by staff translator of the USPTO; obtained on Aug. 8, 2014.*
NPL on Gypsum Partition from National Gypsum Company. Published in 2008 and retrieved from http://nationalgypsum.com/resources/selector/steelstudpartitions.pdf on Aug. 25, 2014.*
Full manual translation of JP 2003/073178A. Furnished by Schreiber Translations, Inc. Feb. 2015.*
Derwent abstract of JP S59-071498 A, entered into database in 1990. Obtained from Thomson Reuters.*
NPL on Al(OH)3 from CAS; retrieved on May 20, 2016 using Sci-Finder service of CAS.*
NPL from Chemical Abstract Services on Al(OH)3 (Year: 2016).*
Sato et al., "Preparation of ALuminum Hydroxide by Reacting Sodium Aluminate Solutions with Mineral Acid", 1981, vol. 31, p. 670-675 (Year: 1981).*
Sadek et al., "Behaviour of Hydrochloric Acid Solutions Containing Alumina", .Kolloid-Zeitsehrifl und Zeitschrifl fiir Polymere, 1963, p. 56 (Year: 1963).*
Chen, Hua et al, Use of Aluminum Trihydrate Filler to Improve the Strength Properties of Cellulosic Paper Exposed to High Temperature Treatment, BioResources 6(3), (2011), pp. 2399-2410.
Akrochem Corporation, Bulletin "Fire Retardants Alumina Trihydrate" Akron, Ohio, Apr. 2011.
ASTM WK25392—Revision of C473—09 Standard Test Methods for Physical Testing of Gypsum Panel Products (hereinafter "ASTM Pub. WK25392") available at the web address www.astm.org/DATABASE.CART/WORKITEMS/WK25392.htm, Aug. 6, 2009.
Blaine, "Accelerating the hydration of calcium sulfate hemihydrate via high energy mixing," Materials and Structures, Jul. 1997, 30:362-365.
Burrows, "A Decade's Experience of Gypsum Board Weight Reduction in the U.S.", 14. Internationale Baustofftagung {Weimar, Sep. 20-23, 2000}, 1.0197-1.0207.
Camp, T. F., "The Manufacture of Gypsum Board", Chapter III, Section II, The Manufacture and Technoloqy of Gypsum Products, Dec. 22, 1950.
Chen et al., "Use of Aluminum Trihydrate filler to improve the strength properties of cellulosic paper exposed to high temperature treatment" BioResources 6(3), 2399-2410, 2011.
Derwent Abstract 78-64264A of JP 53 088031 A, WPI/Derwent Publications, Ltd. (London} {Aug. 3, 1978).
Drywall & Veneer Plaster Construction (Cladding-Curved Surfaces), Gypsum Construction Handbook—90th Anniversarv Edition, United States Gypsum Company, 182-185 (1992).
Englert, et al., "Properties of Gypsum Fiberboard Made by the USG Process", Proceedings of the 4th International Inorganic-Bonded Wood & Fiber Composite Materials Conference, Sep. 25-28, 1994, Spokane, WA, A.A Moslemi ed., 1995, 4:52-58.
Grace Specialty Vermiculite, "VCX Vermiculite Ore Concentrate", W.R. Grace & Co., Conn. USA (2008).
Grace Specialty Vermiculite, "Zonolite #3 Agricultural/Horticultural Vermiculite" W.R. Grace & Co., Conn. USA (1999).
Grodzka, P. et al.; On the Development of Heat Storage Building Materials; Conf—820814-23; DE82 020814; Library of Congress Newspaper RM (Aug. 1982).
Hannant, D.J. et al.; Polyolefin Fibrous Networks in Cement Matrices for Low Cost Sheeting; Phil. Trans. R. Soc. Land; 1980; pp. 591-597; A 294; Civil Engineering Department Univ. of Surrev, Guildford, Surrey GU2 5XH, U.K.
K.F.Mikhaylov—Manual for manufacturing prefabricated reinforced concrete articles, English Moscow, Stroyizdat, 1982, pp. 42,44.
Lin et al., "Characterization and Analysis of Porous, Brittle Solid Structures by Micro CT" Abstracts of Sth World Congress on Industrial Process Tomography, Bergen, Norway, Paper No. VIA07, p. 92 (Sep. 6, 2007).
Lin et al., "Characterization and Analysis of Porous, Brittle Solid Structures by X-Ray Micro CT" JOM, vol. 62, No. 12, p. 91-94, Mineral, Metals and Materials Society, Dec. 2010.
Merck Index for Alumina Trihydrate, p. 61, 1996.
Miller, et al., "Commercial Scale-Up Experience with USG's Gypsum Fiberboard Process", Proceedings of the 7th International Inorganic-Bonded Wood & Fiber Composite Materials Conference, Sun Valley, ID, A.A. Moslemi ed., 2000, 7:337-355.
Miller, et al., "Development and Scale-Up of USG's Gypsum Fiberboard Technology", Proceedings of the 6th International Inorganic-Bonded Wood & Fiber Composite Materials Conference, Sun Valley, ID, A.A. Moslemi, ed., 1998, 6:4-12.
Miller, et al., "USG Process for Manufacturing Fiber Composite Panels", International Cement Review, Nov. 1995, pp. 41-42.
Miller, et al., "USG Process for Manufacturing Gypsum Fiber Composite Panels" Proceedings of the 4th International Inorganic-Bonded Wood & Fiber Composite Materials Conference, Sep. 25-28, 1994, Spokane, WA, A.A. Moslemi ed., 1995, 4:47-51.
Morose, "An Overview of Alternatives to Tetrabromobisphenol A (TBBPA) and Hexabromocyclododecane (HBDC)", Mar. 2006, A Publication of the Lowell Center for Sustainable Production, University of Massachusetts Lowell, 32 total pages.
Peterson, Kurt, "Engineered Gypsum Panels, the Development and Application of Densified Zones at the Paper/Core Interface of Gypsum Panels", Proceedings of Gypsum 2000, 6th International Conference on Natural and Synthetic Gypsum, Toronto, Canada, May 2000, pp. 9-1-9-16.

(56) References Cited

OTHER PUBLICATIONS

Potter, Michael J., "Vermiculite" US Geological Survey Minerals Yearbook—2001, 5 total paqes (p. 82.1-82.3 and two paqes of tables) (2001).

Salyer, et al., "Utilization of Bagasse in New Composite Building Materials", Ind. Eng. Chem. Prod. Res. Dev. 1982; pp. 17-23; 21; Center for Basic and Applied Polymer Research, Univ. of Dayton, OH 45469.

Shipp, et al., "Bench Tests for Characterizing the Thermophysical Properties of Type X Special Fire Resistant Gypsum Board Exposed to Fire", ASTM International, Journal of Testing and Evaluation, v. 39, n. 6, Nov. 2011, 1023-1029.

Shipp et al., "Thermophysical Characterization of Type X Special Fire Resistant Gypsum Board", Proceedings of the Fire and Materials 2011 Conference, San Francisco, Jan. 31-Feb. 2, 2011, Interscience Communications Ur., London, UK, p. 417-426.

U.S. Department of Labor, Material Safety Data Sheet, "Vermiculite Concentrate (Grades 2, 3, 4, 5, 55)", 2 paqes, VA, USA (Jan. 3, 2008).

Van Wazer, Phosphorus and Its Compounds, vol. 1, Interscience Publishers, Inc., New York (1958), oo. 419-427, 679-691; and OD. 6799-6795.

Virginia Vermiculite LLC, "Grade No. 4 Vermiculite Concentrate", VA, USA (Jan. 2008).

Virginia Vermiculite LLC, "Grade No. 45 Vermiculite Concentrate", VA, USA (Jan. 2008).

Virginia Vermiculite LLC, "Grade No. 5 Vermiculite Concentrate", VA, USA (Sep. 2007).

Weber, Charles, G., "Fiber Building Boards Their Manufacture and Use", Industrial and Engineering Chemistry; Aug. 1935; 27 (8): 896-898; National Bureau of Standards, Washington, D.C.

Russian Notice of Allowance dated May 3, 2017.

Japanese Office Action dated May 3, 2017.

European Office Action dated Aug. 7, 2017.

* cited by examiner

| TABLE Ia: Exemplary Formulations for Reduced Weight and Density, Fire Resistant Gypsum Panels Formed According to Principles of the Present Disclosure | | | |
|---|---|---|---|
| Component | Core Density of About 30.2 to About 40.3 pcf (About 483.8 to About 645.5 kg/m³) | Core Density of About 32.2 to About 38.3 pcf (About 512.8 to About 613.5 kg/m³) | Core Density of About 35.3 to About 37.3 pcf (About 565.5 to About 597.5 kg/m³) |
| Stucco (approx. 95% gypsum) | about 1162 to about 1565 lb/msf (about 5.7 to about 7.6 kg/m²) | about 1227 to about 1502 lb/msf (about 6.0 to about 7.3 kg/m²) | about 1354 to about 1459 lb/msf (about 6.6 to about 7.1 kg/m²) |
| Core /weight gypsum | about 1425 to about 1780 lb/msf (about 7.0 to about 8.7 kg/m²) | about 1500 to about 1700 lb/msf (about 7.3 to about 8.3 kg/m²) | about 1600 lb/msf (about 7.8 kg/m²) |
| High expansion vermiculite (% by weight of stucco) | about 5 to about 10 | about 5.5 to about 8.0 | about 6.0 |
| Starch (% by weight of stucco) | up to about 3 | up to about 2.5 | up to about 1.5 |
| Phosphate (% by weight of stucco) | up to about 0.40 | up to about 0.25 | up to about 0.15 |
| Dispersant (% by weight of stucco) | up to about 1 | up to about 0.8 | up to about 0.5 |
| High Efficiency Heat Sink Additive (% by weight of stucco) | up to about 10 | up to about 10 | up to about 10 |
| Mineral, Glass, or Carbon fiber (% by weight of stucco) | about 0.3 to about 0.9 | about 0.4 to about 0.7 | about 0.5 |
| Paper Cover Sheets | about 40 to about 65 lb/msf (about 195 to about 317 g/m²) | about 48 to about 60 lb/msf (about 234 to about 293 g/m²) | about 48 to about 54 lb/msf (about 234 to about 264 g/m²) |
| Board Density (core and cover sheets) | about 30 to about 39.5 pcf (about 480.6 to about 632.7 kg/m³) | about 32 to about 38.5 pcf (about 512.6 to about 616.7 kg/m³) | about 35.5 to about 37.5 pcf (about 568.7 to about 60.70 kg/m³) |
| Board Weight, 5/8 inch thick panel | about 1600 to about 2055 lb/msf (about 7.8 to about 10 kg/m²) | about 1700 to about 2000 lb/msf (about 8.3 to about 9.8 kg/m²) | about 1850 to about 1950 lb/msf (about 9.0 to about 9.5 kg/m²) |

FIG. 1A

| | Table Ib: Exemplary Formulations for Low Weight and Density, Fire Resistant Gypsum Panels Formed According to Principles of the Present Disclosure | | |
|---|---|---|---|
| Component | Core Density Of About 25 to About 36 pcf | Core Density Of About 27 to About 33 pcf | Core Density Of About 28 to About 30 pcf |
| Stucco (lb/msf) (at least 95% gypsum) | about 1040 to about 1490 | about 1120 to about 1370 | about 1160 to about 1245 |
| Set gypsum (lb/msf) | about 1220 to about 1750 | about 1315 to about 1610 | about 1360 to about 1460 |
| Pregelatinized Starch (% by weight of stucco) | about 0.3 to about 4.0 | about 0.5 to about 2.0 | about 1.5 to about 1.8 |
| Phosphate (% by weight of stucco) | about 0.15 to about 0.5 | about 0.10 to about 0.15 | about 0.10 to about 0.15 |
| Dispersant (% by weight of stucco) | about 1.5 to about 0.3 | about 1.2 to about 0.5 | about 1.0 to about 0.75 |
| Mineral, Glass, or Carbon fiber (% by weight of stucco) | about 0.1 to about 0.3 | about 0.1 to about 0.3 | about 0.1 to about 0.3 |
| Manila Paper First Cover Sheets (lb/msf) | about 40 to about 60 | about 45 to about 55 | about 48 to about 53 |
| Board Density (pcf) (core and cover sheets) | about 27 to about 37 | about 29 to about 34 | about 30 to about 32 |
| Board Weight, 5/8 inch thick panel (lb/msf) | about 1380 to about 1900 | about 1490 to about 1740 | about 1540 to about 1640 |

FIG. 1B

TABLE IIa:
High Temperature Thermal Insulation Index Testing of Specimens from Laboratory Samples Referenced in Example 2A

| Sample | Approx. Ave. Board Density (pcf) (kg/m³) | Approx. High Expan. Vermiculite (% by weight of Stucco) | Stucco (lbs/MSF) (kg/m²) | Approx. ATH (% by weight of Stucco) | ATH (lbs/MSF) (g/m²) | Avg. Thermal Insulation Index (TI) (mins. from 40°C to 200°C) | Stucco Diff. (lbs/MSF) (g/m²) | TI Change |
|---|---|---|---|---|---|---|---|---|
| 1 | 29.8 (477.5) | 0% | 1250 (6.11) | 0% | 0 | 22.6 | 0 | 0 |
| 2 | 30.5 (488.7) | 0% | 1230 (6.01) | 4% | 49 (239.3) | 23.5 | -20 (-97.7) | 0.9 |

FIG. 3A

TABLE IIb:
High Temperature Thermal Insulation Index Testing of Specimens from Laboratory Samples Referenced in Example 2A

| Sample | Approx. Ave. Board Density (pcf) (kg/m³) | Approx. High Expan. Vermiculite (% by weight of Stucco) | Stucco (lbs/MSF) (kg/m²) | Approx. ATH (% by weight of Stucco) | ATH (lbs/MSF) (g/m²) | Avg. Thermal Insulation Index (TI) (mins. from 40°C to 200°C) | Stucco Diff. (lbs/MSF) (g/m²) | TI Change |
|---|---|---|---|---|---|---|---|---|
| 3 | 30.8 (493.5) | 7% | 1225 (5.98) | 0% | 0 | 23 | 0 | 0 |
| 4 | 31.6 (506.3) | 7% | 1230 (6.01) | 2% | 25 (122.1) | 24.6 | 5 (24.4) | 1.6 |
| 5 | 31.4 (503.1) | 7% | 1200 (5.86) | 4% | 48 (234.4) | 24.3 | -25 (-122.1) | 1.3 |
| 6 | 31.6 (506.3) | 7% | 1200 (5.86) | 5% | 60 (293.0) | 24.9 | -25 (-122.1) | 1.9 |
| 7 | 31.9 (511.1) | 7% | 1210 (5.91) | 7% | 85 (415.1) | 25.5 | -15 (-73.3) | 2.5 |
| 8 | 32.9 (527.2) | 7% | 1210 (5.91) | 10% | 121 (590.9) | 26.3 | -15 (-73.3) | 3.3 |
| 9 | 30.5 (488.7) | 7% | 1150 (5.62) | 4% | 46 (224.7) | 23.9 | -75 (-366.3) | 0.9 |

FIG. 3B

| Sample | Approx. Ave. Board Density (pcf) (kg/m³) | Approx. High Expan. Vermiculite (% by weight of Stucco) | Approx. ATH (% by weight of Stucco) | High Temp. Shrinkage(S) (Avg. %) | High Temp. Thickness Expansion (TE) (Avg. %) |
|---|---|---|---|---|---|
| 1 | 29.8 (477.5) | 0% | 0% | 18.8 | -23.6 |
| 2 | 30.5 (488.7) | 0% | 4% | 9.2 | -11.5 |
| 3 | 30.8 (493.5) | 7% | 0% | 7.0 | 6.5 |
| 4 | 31.6 (506.3) | 7% | 2% | 7.3 | 12.6 |
| 5 | 31.4 (503.1) | 7% | 4% | 5.5 | 12.7 |
| 6 | 31.6 (506.3) | 7% | 5% | 6.0 | 11.0 |
| 7 | 31.9 (511.1) | 7% | 7% | 4.5 | 13.9 |
| 8 | 32.9 (527.2) | 7% | 10% | 5.0 | 17.9 |
| 9 | 30.5 (488.7) | 7% | 4% | 6.3 | 5.0 |

TABLE IIc: High Temperature Shrinkage and Thermal Expansion Testing of Specimens from Laboratory Samples Referenced in Example 2A

FIG. 3C

TABLE IIIa:
High Temperature Thermal Insulation Index Testing of Specimens from Laboratory Samples Referenced in Example 2B

| Sample | Approx. Ave. Board Density (pcf) (kg/m³) | Approx. High Expan. Vermiculite (% by weight of Stucco) | Stucco (lbs/MSF) (kg/m²) | Approx. ATH (% by weight of Stucco) | ATH (lbs/MSF) (g/m²) | Avg. Thermal Insulation Index (TI) (mins. from 40°C to 200°C) | Stucco Diff. (lbs/MSF) (g/m²) | TI Change |
|---|---|---|---|---|---|---|---|---|
| 10 | 36.6 (586.4) | 7% | 1450 (7.08) | 0% | 0 | 26.3 | 0 | 0 |
| 11 | 36.7 (588.0) | 7% | 1450 (7.08) | 2% | 29.0 (141.6) | 26.4 | 0 | 0.1 |
| 12 | 37.5 (600.9) | 7% | 1450 (7.08) | 4% | 58.0 (283.3) | 27.6 | 0 | 1.3 |
| 13 | 38.3 (613.7) | 7% | 1450 (7.08) | 7% | 101.5 (495.7) | 27.5 | 0 | 1.2 |
| 14 | 38.9 (623.3) | 7% | 1450 (7.08) | 7% | 101.5 (495.7) | 27.8 | 0 | 1.5 |

FIG. 5A

TABLE IIIb:
High Temperature Thermal Insulation Index Testing of Specimens from Laboratory Samples Referenced in Example 2B

| Sample | Approx. Ave. Board Density (pcf) (kg/m³) | Approx. High Expan. Vermiculite (% by weight of Stucco) | Stucco (lbs/MSF) (kg/m²) | Approx. ATH (% by weight of Stucco) | ATH (lbs/MSF) (g/m²) | Avg. Thermal Insulation Index (TI) (mins. from 40°C to 200°C) | Stucco Diff. (lbs/MSF) (g/m²) | TI Change |
|---|---|---|---|---|---|---|---|---|
| 15 | 33.0 (528.8) | 7% | 1350 (6.59) | 7% | 94.5 (461.5) | 25.9 | 0 | 0 |
| 16 | 35.2 (564.0) | 7% | 1250 (6.11) | 7% | 87.5 (427.3) | 24.6 | -100 (-488.4) | -1.3 |
| 17 | 32.4 (519.1) | 7% | 1250 (6.11) | 4% | 35.2 (171.9) | 22.9 | -100 (-488.4) | -3 |

FIG. 5B

| | TABLE IIIc: High Temperature Shrinkage and Thermal Expansion Testing of Specimens from Laboratory Samples Referenced in Example 2B | | | | |
|---|---|---|---|---|---|
| Sample | Approx. Ave. Board Density (pcf) (kg/m³) | Approx. High Expan. Vermiculite (% by weight of Stucco) | Approx. ATH (% by weight of Stucco) | High Temp. Shrinkage(S) (Avg. %) | High Temp. Thickness Expansion (TE) (Avg. %) |
| 10 | 36.6 (586.4) | 7% | 0% | 0.3 | 16.4 |
| 11 | 36.7 (588.0) | 7% | 2% | 1.0 | 14.5 |
| 12 | 37.5 (600.9) | 7% | 4% | 0.1 | 18.8 |
| 13 | 38.3 (613.7) | 7% | 7% | 0.75 | 13.9 |
| 14 | 38.9 (623.3) | 7% | 7% | 1.2 | 17.4 |
| 15 | 33.0 (528.8) | 7% | 7% | 2.0 | 14.0 |
| 16 | 35.2 (564.0) | 7% | 7% | 1.2 | 17.4 |
| 17 | 32.4 (519.1) | 7% | 4% | 1.49 | 16.27 |

FIG. 5C

TABLE IVa:
High Temperature Thermal Insulation Index Testing of Specimens from Laboratory Samples Referenced in Example 2C

| Sample | Approx. Ave. Board Density (pcf) (kg/m³) | Approx. High Expan. Vermiculite (% by weight of Stucco) | Stucco (lbs/MSF) (kg/m²) | Approx. ATH (% by weight of Stucco) | ATH (lbs/MSF) (g/m²) | Avg. Thermal Insulation Index (TI) (mins. from 40°C to 200°C) | Stucco Diff. (lbs/MSF) (g/m²) | TI Change |
|---|---|---|---|---|---|---|---|---|
| 18 | 35.6 (570.4) | 10.0% | 1450 (7.08) | 0% | 0 | 22.5 | 0 | 0.0 |
| 19 | 36.2 (580.0) | 10.3% | 1450 (7.08) | 3% | 25 (122.1) | 23.5 | 0 | 1.0 |
| 20 | 37.0 (592.9) | 10.0% | 1480 (7.23) | 3% | 25 (122.1) | 23.4 | 30 (146.5) | 0.9 |

FIG. 6A

| Sample | Approx. Ave. Board Density (pcf) (kg/m³) | Approx. High Expan. Vermiculite (% by weight of Stucco) | Approx. ATH (% by weight of Stucco) | High Temp. Shrinkage(S) (Avg. %) | Thickness Expansion (TE) (Avg. %) |
|---|---|---|---|---|---|
| 18 | 35.6 (570.4) | 10.0% | 0% | 0.8 | 51.2 |
| 19 | 36.2 (580.0) | 10.3% | 3% | +2.8* | 35.9 |
| 20 | 37.0 (592.9) | 10.0% | 3% | 1.6 | 71.3 |

TABLE IVb: High Temperature Shrinkage and Thermal Expansion Testing of Specimens from Laboratory Samples Referenced in Example 2C

* The positive sign (+) indicates that the sample expanded when measured for High Temperature Shrinkage (S).

FIG. 6B

GYPSUM PRODUCTS WITH HIGH EFFICIENCY HEAT SINK ADDITIVES

CROSS REFERENCE TO RELATED APPLICATION

This patent application claims the benefit of U.S. Provisional Patent Application No. 61/600,574, filed Feb. 17, 2012, which is incorporated by reference in its entirety.

BACKGROUND

Should a finished gypsum product be exposed to relatively high temperatures, such as those produced by high temperature flames or gases, portions of the gypsum may absorb sufficient heat to start the release of water from the gypsum dihydrate crystals of the core. The absorption of heat and release of water from the gypsum dihydrate may be sufficient to retard heat transmission through or within the gypsum product for a time. The gypsum product can act as a barrier to prevent high temperature from passing directly therethrough. The heat absorbed by the gypsum product can be sufficient to essentially recalcine portions of the gypsum, depending on the heat source temperatures and exposure time. At certain temperature levels, the heat applied to a gypsum product also may cause phase changes to the anhydrite of the gypsum and rearrangement of the crystalline structures. In some instances, the presence of salts and impurities may affect the phase transition temperatures, resulting in a difference in crystal morphologies.

Gypsum panels have been produced that resist the effects of relatively high temperatures for a period of time, which may inherently delay passage of high heat levels through or between the panels, and into (or through) systems using them. Gypsum panels referred to as fire resistant or "fire rated" typically are formulated to enhance the panels' ability to delay the passage of heat though wall or ceiling structures and play an important role in controlling the spread of fire within buildings. As a result, building code authorities and other concerned public and private entities typically set stringent standards for the fire resistance performance of fire rated gypsum panels.

The ability of gypsum panels to resist fire and the associated extreme heat may be evaluated by carrying out generally-accepted tests. Examples of such tests are routinely used in the construction industry, such as those published by Underwriters Laboratories ("UL"), such as the UL U305, U419 and U423 test procedures and protocols, as well as procedures described in the specifications E119, e.g., E119-09a, published by the American Society for Testing and Materials (ASTM). Some of such tests comprise constructing test assemblies using gypsum panels, normally a single-layer application of the panels on each face of a wall frame formed by wood or steel studs. Depending on the test, the assembly may or may not be subjected to load forces. The face of one side of the assembly, such as an assembly constructed according to UL U305, U419 and U423, for example, is exposed to increasing temperatures for a period of time in accordance with a heating curve, such as those discussed in the ASTM E119 procedures.

The temperatures proximate the heated side and the temperatures at the surface of the unheated side of the assembly are monitored during the tests to evaluate the temperatures experienced by the exposed gypsum panels and the heat transmitted through the assembly to the unexposed panels. The tests are terminated upon one or more structural failures of the panels and/or when the temperatures on the unexposed side of the assembly exceed a predetermined threshold. Typically, these threshold temperatures are based on the maximum temperature at any one of such sensors and/or the average of the temperature sensors on the unheated side of the assembly.

Test procedures, such as those set forth in UL U305, U419 and U423 and ASTM E119, are directed to an assembly's resistance to the transmission of heat through the assembly as a whole. The tests also provide, in one aspect, a measure of the resistance of the gypsum panels used in the assembly to shrinkage in the x-y direction (width and length) as the assembly is subjected to high temperature heating. Such tests also provide a measure of the panels' resistance to losses in structural integrity that result in opening gaps or spaces between panels in a wall assembly, with the resulting passage of high temperatures into the interior cavity of the assembly. In another aspect, the tests provide a measure of the gypsum panels' ability to resist the transmission of heat through the panels and the assembly. It is believed that such tests reflect the specified system's capability for providing building occupants and firemen/fire control systems a window of opportunity to address or escape fire conditions.

In the past, various strategies were employed to improve the fire resistance of fire rated gypsum panels. For example, thicker, denser panel cores have been provided which use more gypsum relative to less dense gypsum panels, and therefore include an increased amount of water chemically bound within the gypsum (calcium sulfate dihydrate), to act as a heat sink, to reduce panel shrinkage, and to increase the structural stability and strength of the panels. Alternatively, various ingredients including glass fiber and other fibers have been incorporated into the gypsum core to enhance the gypsum panel's fire resistance by increasing the core's tensile strength and by distributing shrinkage stresses throughout the core matrix. Similarly, amounts of certain clays, such as those of less than about one micrometer size, and colloidal silica or alumina additives, such as those of less than one micrometer size, have been used in the past to provide increased fire resistance (and high temperature shrink resistance) in a gypsum panel core. It has been recognized, however, that reducing the weight and/or density of the core of gypsum panels by reducing the amount of gypsum in the core will adversely affect the structural integrity of the panels and their resistance to fire and high heat conditions.

Another approach has been to add unexpanded vermiculite (also referred to as vermiculite ore) and mineral or glass fibers into the core of gypsum panels. In such approaches, the vermiculite is expected to expand under heated conditions to compensate for the shrinkage of the gypsum components of the core. The mineral/glass fibers were believed to hold portions of the gypsum matrix together. There is a continuing need to develop gypsum products, e.g., at lower weight, that are less susceptible to the damaging effects of extreme heat.

It will be appreciated that this background description has been created to aid the reader, and is not to be taken as a reference to prior art nor as an indication that any of the indicated problems were themselves appreciated in the art.

BRIEF DESCRIPTION OF THE DRAWINGS

FIGS. 1a-b are tables (Table Ia-b) of exemplary formulations for gypsum panels, in accordance with the present invention.

FIGS. 3a-c are tables (Tables IIa-c) of High Temperature Thermal Insulation Index (TI), High Temperature Shrinkage (S), and High Temperature Thermal Expansion (TE) testing of Samples 1-9 in Example 2A with varying amounts ATH.

FIGS. 5a-c are tables (Tables IIIa-c) of High Temperature Thermal Insulation Index (TI), High Temperature Shrinkage (S), and High Temperature Thermal Expansion (TE) testing of Samples 10-17 in Example 2B with varying amounts of ATH, in accordance with some embodiments of the present invention.

FIGS. 6a-b are tables (Tables IVa-b) of High Temperature Thermal Insulation Index (TI), High Temperature Shrinkage (S), and High Temperature Thermal Expansion (TE) testing of Samples 18-20 in Example 2C with ATH, in accordance with some embodiments of the present invention.

DETAILED DESCRIPTION OF EMBODIMENTS

Figure 2:
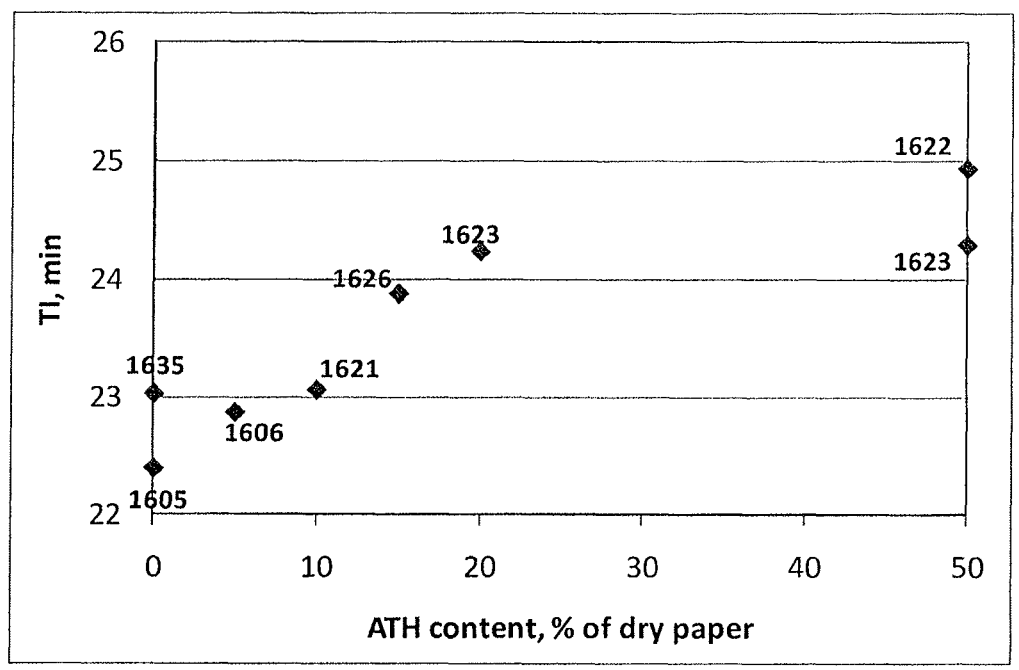
FIG. 2 is a graph that shows the average High Temperature Thermal Insulation Index (TI) time in minutes of board samples as a function of aluminum trihydrate (ATH) content in back paper, in accordance with some embodiments of the present invention, as referenced in Example 1. The board weight in lb/msf is shown for each board sample data point.

Alternative aspects and features of the invention will be appreciated from the following detailed description and the accompanying drawings. As will be appreciated, the principles related to gypsum products with high efficiency heat sink additives (HEHS additives) disclosed herein are capable of being carried out in other and different embodiments, and capable of being modified in various respects. Accordingly, it is to be understood that the following detailed description is exemplary and explanatory only and does not restrict the scope of the disclosed principles.

Some embodiments of the present invention provide a gypsum product comprising, consisting essentially of, or consisting of a set gypsum core at least partially covered by at least one cover sheet with, e.g., at least one of the cover sheets comprising, consisting essentially of, or consisting of, e.g., paper and at least one high efficiency heat sink additive, e.g., aluminum trihydrate.

Some embodiments of the present invention are directed to a gypsum panel comprising a set gypsum core disposed between two cover sheets, the set gypsum core formed from at least water, stucco, and at least one high efficiency heat sink additive, e.g., ATH, the panel having a density of about 27 lb/ft$^3$ (about 430 kg/m$^3$) to about 37 lb/ft$^3$ (about 590 kg/m$^3$) and a High Temperature Thermal Insulation Index of greater than about 17 minutes. The High Temperature Thermal Insulation Index can be determined in accordance with the procedures set forth in the report ASTM WK25392— Revision of C473-09 Standard Test Methods for Physical Testing of Gypsum Panel Products (hereinafter "ASTM Publication WK25392") available at the web address www.astm.org/DATABASE.CART/WORKITEMS/WK25392.htm or from ASTM International in other forms or formats.

Some embodiments of the present invention also provide a gypsum panel comprising a set gypsum core disposed between two cover sheets, the set gypsum core formed from at least water, stucco, and at least one high efficiency heat sink additive, e.g., ATH, the panel having a density of about 27 lb/ft$^3$ (about 430 kg/m$^3$) to about 37 lb/ft$^3$ (about 590 kg/m$^3$), and the panel effective to inhibit the transmission of heat through an assembly of said panels prepared pursuant to UL U419 procedures wherein one surface is exposed to a heat source and an opposite unheated surface includes a plurality of sensors applied thereto such that the maximum single sensor temperature on the unheated surface is less than about 415° F. at about 30 minutes elapsed time when measured pursuant to UL U419, the heat source following a time-temperature curve in accordance with ASTM standard E119-09a, and the sensors arrayed in a pattern in accordance with UL U419 procedures.

It is advantageous in the manufacturing of gypsum products to reduce the weight of the product without loss of beneficial properties, such as physical strength. For example, for wallboard, core strength characteristics such as nail pull resistance and core hardness have minimum standards set by the wallboard industry. Also, meeting wallboard fire performance such as that required for Type X classification is challenging due to the reduction in gypsum content of the board, as is necessary for weight reduction. The removal of a portion of the gypsum effectively decreases some of the heat sinking capacities that gypsum exhibits, such as loss of its combined water at elevated temperature. Some embodiments of the present invention compensate for the loss of gypsum with the presence of at least one high efficiency heat sink additive.

In embodiments of the present invention, a gypsum product or a constituent component useful in a method for making a gypsum product includes one or more additives referred to herein as high efficiency heat sink additives ("HEHS additives"). HEHS Additives have a heat sink capacity that exceeds the heat sink capacity of comparable amounts of gypsum dihydrate in the temperature range causing the dehydration and release of water vapor from the gypsum dihydrate component of the gypsum product. Such additives can be selected from compositions, such as aluminum trihydrate or other metal hydroxides, such as magnesium hydroxide, that decompose, releasing water vapor in the same or similar temperature ranges as does gypsum dihydrate. While other HEHS additives (or combinations of HEHS additives) with increased heat sink efficiency relative to comparable amounts of gypsum dihydrate can be used, preferred HEHS additives provide a sufficiently-increased heat sink efficiency relative to gypsum dihydrate to offset any increase in weight or other undesired properties of the HEHS additives when used in a gypsum product intended for fire rated or other high temperature applications.

For example, in embodiments, one or more HEHS additives will undergo an endothermic reaction to absorb heat when exposed to significant temperature increases. In some such embodiments, the heat of decomposition (which may be a dehydration reaction) per unit mass of the HEHS additive(s) consumes at least about 685 Joules/gram, in other embodiments at least about 1000 Joules/gram, and in still other embodiments consumes from about 1100 to about 1400 Joules/gram. The heat of decomposition can be, e.g., as listed in the table below. In the table, an "X" represents the range "from about [corresponding value in top row] to about [corresponding value in left-most column]." For example, the first "X" is the range "from about 1000 Joules/gram to about 1100 Joules/gram."

|            | about 1000 J/g | about 1100 J/g | about 1200 J/g | about 1300 J/g |
|------------|----------------|----------------|----------------|----------------|
| about 1100 J/g | X |   |   |   |
| about 1200 J/g | X | X |   |   |
| about 1300 J/g | X | X | X |   |
| about 1400 J/g | X | X | X | X |

Thus, the heat of decomposition can have a range between and including any aforementioned endpoints. In such embodiments, the HEHS additive(s) can have a heat of decomposition per unit mass in the relevant temperature range that is significantly higher than the gypsum dihydrate in the gypsum product, e.g., gypsum panel. Accordingly, the HEHS additive consumes more energy (Joules/gram) during heating than consumed by the dehydration of the gypsum dihydrate.

In some embodiments, the lowest decomposition temperature of the HEHS additive(s) is about 40° C. or more. In other embodiments, the decomposition temperatures of the HEHS additive(s) range from about 40° C. to about 1000° C.; in other embodiments, from about 150° C. to about 450° C.; and in other embodiments, from about 150° C. to about 300° C. In yet another embodiment, the HEHS additive(s) begin endothermic thermal decomposition at about 150° C. and are substantially, or entirely, decomposed at a temperature of about 980° C., which is the typical 1-hour endpoint temperature in an ASTM-E119 temperature curve. The decomposition temperature can be, e.g., as listed in the table below. In the table, an "X" represents the range "from about [corresponding value in top row] to about [corresponding value in left-most column]." For example, the first "X" is the range "from about 100° C. to about 200° C."

|            | about 100° C. | about 200° C. | about 300° C. | about 400° C. | about 500° C. | about 600° C. | about 700° C. | about 800° C. | about 900° C. |
|------------|---------------|---------------|---------------|---------------|---------------|---------------|---------------|---------------|---------------|
| about 200° C. | X |   |   |   |   |   |   |   |   |
| about 300° C. | X | X |   |   |   |   |   |   |   |
| about 400° C. | X | X | X |   |   |   |   |   |   |
| about 500° C. | X | X | X | X |   |   |   |   |   |
| about 600° C. | X | X | X | X | X |   |   |   |   |
| about 700° C. | X | X | X | X | X | X |   |   |   |
| about 800° C. | X | X | X | X | X | X | X |   |   |
| about 900° C. | X | X | X | X | X | X | X | X |   |
| about 1000° C. | X | X | X | X | X | X | X | X | X |

Thus, the temperature of decomposition can have a range between and including any aforementioned endpoints.

One preferred HEHS additive comprises, consists essentially of, or consists of aluminum trihydrate (ATH), which is also known as alumina trihydrate and hydrated alumina, containing crystallized or otherwise bound or complexed water. ATH typically is very stable at room temperature. Above temperatures between about 180° C. and 205° C., ATH typically undergoes an endothermic decomposition releasing water vapor. The heat of decomposition for such ATH additives is greater than about 1000 Joule/gram, and in one preferred embodiment is about 1170 Joule/gram. Without being bound by theory, it is believed that the ATH additive decomposes to release approximately 35% of the water of crystallization as water vapor when heated above 205° C. as follows: $Al(OH)_3 \rightarrow Al_2O_3 \cdot 3H_2O$. In embodiments using ATH as an HEHS additive, any suitable ATH can be used. In embodiments, ATH from commercial suppliers, such as, Akrochem Corp. of Akron, Ohio, can be used. Any suitable grade of ATH can be used. One example is ATH Grade No. SB-36. ATH Grade No. SB-36 can comprise, consist essentially of, or consist of a median particle size of about 25 microns and a surface area of about 1 $m^2/g$. In other embodiments, other suitable grades of ATH having any suitable median particle size and surface area can be used.

In other embodiments, the HEHS additive(s) comprise, consist essentially of, or consist of magnesium hydroxide. In these embodiments, the magnesium hydroxide HEHS additive preferably has a heat of decomposition greater than about 1000 Joules/gram, such as about 1350 Joules/gram, at or above 180° C. to 205° C. In such embodiments, any suitable magnesium hydroxide can be used, such as that commercially available from commercial suppliers, including Akrochem Corp. of Akron, Ohio.

The increased heat sink capacity of the preferred HEHS additives can be utilized to increase thermal insulation properties of the gypsum products disclosed herein relative to the products formed without the HEHS additive. The amount and composition of the HEHS additive(s) incorporated in the gypsum products disclosed herein vary depending on the desired weight and density of the products, the purity of the stucco used to form the products, the product formulation, the presence of other additives and other similar considerations. Examples of some preferred core formulations for gypsum panels incorporating preferred HEHS additives are summarized in FIG. 1 (Table Ia). The HEHS additive can be added in a dry form and/or a slurry form, with the dry ingredients typically added to the core slurry mixer and the liquid ingredients added to the mixer or in other stages or procedures.

In one such preferred embodiment, a gypsum product is made from a calcined gypsum slurry including an HEHS additive present in an amount effective to increase the High Temperature Thermal Insulation Index of the gypsum product, e.g., a gypsum panel, relative to the High Temperature Thermal Insulation Index of the gypsum product without the HEHS additive. Such amounts can be from about 2% to about 5% by weight of the stucco, about 2% to about 7% by weight of the stucco, and in amounts up to about 15% by weight of the stucco. In some of such preferred embodiments, the incorporation of the HEHS additive in the core formulation allows for the reduction of the stucco content of the formulation to reduce the weight and density of the gypsum product. The amount of HEHS additive can be, e.g., as listed in the table below. In the table, an "X" represents the range "from about [corresponding value in top row] to about [corresponding value in left-most column]." For example, the first "X" is the range "from about 2% to about 3% by weight based on the weight of the stucco."

a thousand square feet and is an area measurement for, e.g., boxes, corrugated media, and wallboard. The term "SQM" is square meter.)

The ratio of HEHS additive to stucco removed from a core formulation can be varied depending on the HEHS additive used, its heat sink properties, the heat sink properties of the specific stucco, the formulation of the gypsum core, the desired thermal insulation properties of the product, the desired weight reduction and physical properties of the product and related concerns. In some preferred embodiments using aluminum trihydrate, the ratio of HEHS additive to removed stucco is about 1:2 in some embodiments, in other embodiments about 1:3, and in still other embodi-

|  | about 2% wt. (wt. stucco) | about 3% wt. (wt. stucco) | about 4% wt. (wt. stucco) | about 5% wt. (wt. stucco) | about 6% wt. (wt. stucco) | about 7% wt. (wt. stucco) | about 8% wt. (wt. stucco) | about 9% wt. (wt. stucco) | about 10% wt. (wt. stucco) | about 11% wt. (wt. stucco) | about 12% wt. (wt. stucco) | about 13% wt. (wt. stucco) | about 14% wt. (wt. stucco) |
|---|---|---|---|---|---|---|---|---|---|---|---|---|---|
| about 3% wt. (wt. stucco) | X | | | | | | | | | | | | |
| about 4% wt. (wt. stucco) | X | X | | | | | | | | | | | |
| about 5% wt. (wt. stucco) | X | X | X | | | | | | | | | | |
| about 6% wt. (wt. stucco) | X | X | X | X | | | | | | | | | |
| about 7% wt. (wt. stucco) | X | X | X | X | X | | | | | | | | |
| about 8% wt. (wt. stucco) | X | X | X | X | X | X | | | | | | | |
| about 9% wt. (wt. stucco) | X | X | X | X | X | X | X | | | | | | |
| about 10% wt. (wt. stucco) | X | X | X | X | X | X | X | X | | | | | |
| about 11% wt. (wt. stucco) | X | X | X | X | X | X | X | X | X | | | | |
| about 12% wt. (wt. stucco) | X | X | X | X | X | X | X | X | X | X | | | |
| about 13% wt. (wt. stucco) | X | X | X | X | X | X | X | X | X | X | X | | |
| about 14% wt. (wt. stucco) | X | X | X | X | X | X | X | X | X | X | X | X | |
| about 15% wt. (wt. stucco) | X | X | X | X | X | X | X | X | X | X | X | X | X |

Thus, the amount can have a range between and including any aforementioned endpoints.

In one example of the use of the HEHS additive, the ratio of HEHS additive to removed stucco on a weight basis is about 1:1 to about 1:2. In one such example where the ratio is about 1:2, in other words, about 40-50 lbs/msf (about 0.2 kg/SQM) of the HEHS additive is incorporated in the core formulation and about 80-100 lbs/msf (about 0.4-0.5 kg/SQM) of stucco is removed from the formulation. Accordingly, a weight savings of about 40-50 lbs/msf (about 0.2 kg/SQM) is achieved in this example without a substantial change in the thermal insulation properties of the product. (The term "msf" or "MSF" is a standard abbreviation for ments about 1:4. The ratio of HEHS additive(s) to removed stucco may be different for different HEHS additive compositions and applications.

In some embodiments, an HEHS additive, e.g., ATH, is added to one or more or all of the facing layers of a gypsum product, e.g., paper facings, to provide a first barrier against heat. The enhanced heat absorbing capability of the paper slows down the rate at which heat is transferred through the product. In embodiments where the gypsum product comprises wallboard, slowing the transfer of heat can protect building elements behind it. In addition, the HEHS additive can provide improved surface burning characteristics of the paper facing. In some embodiments, the HEHS additive is incorporated into the paper facings by being formulated as a component of the paper core and/or applied topically to the surface of the paper. In some embodiments, a gypsum product includes a front cover sheet, a rear cover sheet, or both cover sheets which include an HEHS additive.

In some embodiments, HEHS additive particles are added to the ground pulp during paper manufacturing. In this case, the HEHS additive can be added as a filler in the same manner that other fillers (e.g., calcium carbonate) are added, and can be in addition to other components (sizing agents) used to make paper. The remainder of the paper making operations, including pressing and drying, can proceed in the normal manner.

HEHS additive particles can be added to the ground pulp during paper manufacturing at addition levels where the HEHS additive is present in an amount effective to increase the High Temperature Thermal Insulation Index of the paper and/or the gypsum product in which the paper is used relative to the High Temperature Thermal Insulation Index of the paper and/or gypsum product without the HEHS additive. This can be about 5% to about 40% by weight of the dry pulp. The amount of HEHS additive in the paper can be, e.g., as listed in the tables below. In the table, an "X" represents the range "from about [corresponding value in top row] to about [corresponding value in left-most column]." For example, the first "X" is the range "from about 5% to about 6% by weight based on the dry weight of paper pulp."

|  | about 5% wt. (wt. dry paper pulp) | about 6% wt. (wt. dry paper pulp) | about 8% wt. (wt. dry paper pulp) | about 10% wt. (wt. dry paper pulp) | about 12% wt. (wt. dry paper pulp) | about 14% wt. (wt. dry paper pulp) | about 16% wt. (wt. dry paper pulp) | about 18% wt. (wt. dry paper pulp) |
|---|---|---|---|---|---|---|---|---|
| about 6% wt. (wt. dry paper pulp) | X | | | | | | | |
| about 8% wt. (wt. dry paper pulp) | X | X | | | | | | |
| about 10% wt. (wt. dry paper pulp) | X | X | X | | | | | |
| about 12% wt. (wt. dry paper pulp) | X | X | X | X | | | | |
| about 14% wt. (wt. dry paper pulp) | X | X | X | X | X | | | |
| about 16% wt. (wt. dry paper pulp) | X | X | X | X | X | X | | |
| about 18% wt. (wt. dry paper pulp) | X | X | X | X | X | X | X | |
| about 20% wt. (wt. dry paper pulp) | X | X | X | X | X | X | X | X |

|  | about 5% wt. (wt. dry paper pulp) | about 6% wt. (wt. dry paper pulp) | about 8% wt. (wt. dry paper pulp) | about 10% wt. (wt. dry paper pulp) | about 12% wt. (wt. dry paper pulp) | about 14% wt. (wt. dry paper pulp) | about 16% wt. (wt. dry paper pulp) | about 18% wt. (wt. dry paper pulp) |
|---|---|---|---|---|---|---|---|---|
| about 22% wt. (wt. dry paper pulp) | X | X | X | X | X | X | X | X |
| about 24% wt. (wt. dry paper pulp) | X | X | X | X | X | X | X | X |
| about 26% wt. (wt. dry paper pulp) | X | X | X | X | X | X | X | X |

-continued

|  | about 5% wt. (wt. dry paper pulp) | about 6% wt. (wt. dry paper pulp) | about 8% wt. (wt. dry paper pulp) | about 10% wt. (wt. dry paper pulp) | about 12% wt. (wt. dry paper pulp) | about 14% wt. (wt. dry paper pulp) | about 16% wt. (wt. dry paper pulp) | about 18% wt. (wt. dry paper pulp) |
|---|---|---|---|---|---|---|---|---|
| about 28% wt. (wt. dry paper pulp) | X | X | X | X | X | X | X | X |
| about 30% wt. (wt. dry paper pulp) | X | X | X | X | X | X | X | X |
| about 32% wt. (wt. dry paper pulp) | X | X | X | X | X | X | X | X |
| about 34% wt. (wt. dry paper pulp) | X | X | X | X | X | X | X | X |
| about 36% wt. (wt. dry paper pulp) | X | X | X | X | X | X | X | X |
| about 38% wt. (wt. dry paper pulp) | X | X | X | X | X | X | X | X |
| about 40% wt. (wt. dry paper pulp) | X | X | X | X | X | X | X | X |

|  | about 20% wt. (wt. dry paper pulp) | about 22% wt. (wt. dry paper pulp) | about 24% wt. (wt. dry paper pulp) | about 26% wt. (wt. dry paper pulp) | about 28% wt. (wt. dry paper pulp) | about 30% wt. (wt. dry paper pulp) | about 32% wt. (wt. dry paper pulp) | about 34% wt. (wt. dry paper pulp) | about 36% wt. (wt. dry paper pulp) | about 38% wt. (wt. dry paper pulp) |
|---|---|---|---|---|---|---|---|---|---|---|
| about 22% wt. (wt. dry paper pulp) | X |  |  |  |  |  |  |  |  |  |
| about 24% wt. (wt. dry paper pulp) | X | X |  |  |  |  |  |  |  |  |
| about 26% wt. (wt. dry paper pulp) | X | X | X |  |  |  |  |  |  |  |
| about 28% wt. (wt. dry paper pulp) | X | X | X | X |  |  |  |  |  |  |
| about 30% wt. (wt. dry paper pulp) | X | X | X | X | X |  |  |  |  |  |
| about 32% wt. (wt. dry paper pulp) | X | X | X | X | X | X |  |  |  |  |
| about 34% wt. (wt. dry paper pulp) | X | X | X | X | X | X | X |  |  |  |
| about 36% wt. (wt. dry paper pulp) | X | X | X | X | X | X | X | X |  |  |

|  | about 20% wt. (wt. dry paper pulp) | about 22% wt. (wt. dry paper pulp) | about 24% wt. (wt. dry paper pulp) | about 26% wt. (wt. dry paper pulp) | about 28% wt. (wt. dry paper pulp) | about 30% wt. (wt. dry paper pulp) | about 32% wt. (wt. dry paper pulp) | about 34% wt. (wt. dry paper pulp) | about 36% wt. (wt. dry paper pulp) | about 38% wt. (wt. dry paper pulp) |
|---|---|---|---|---|---|---|---|---|---|---|
| about 38% wt. (wt. dry paper pulp) | X | X | X | X | X | X | X | X | X | |
| about 40% wt. (wt. dry paper pulp) | X | X | X | X | X | X | X | X | X | X |

Thus, the amount can have a range between and including any aforementioned endpoints.

The HEHS additive can be applied topically to the surface of the paper where the HEHS additive is present in an amount effective to increase the High Temperature Thermal Insulation Index of the paper and/or the gypsum product in which the paper is used relative to the High Temperature Thermal Insulation Index of the paper and/or gypsum product without the HEHS additive. In some embodiments, the topical application is in the form of at least a partial coating consisting of a water based carrier with the HEHS additive at a solids content up to 50%, which can be applied at board production facilities. Upon drying, the HEHS additive on the surface of the paper (where the HEHS additive may be distributed over the surface of the paper) can create a heat protection barrier for improved longevity under fire situations.

In embodiments, any suitable cover sheet can be used. For example, paper sheet, such as Manila paper or kraft paper, can be used as the cover sheet in some embodiments. In some embodiments, such as those where the board may be exposed to a substantial amount of moisture, a suitable cover sheet comprises, consists essentially of, or consists of a mat, such as a fibrous mat.

Useful cover sheet paper includes Manila 7-ply and News-Line 5-ply, available from United States Gypsum Corporation, Chicago, Ill.; Grey-Back 3-ply and Manila Ivory 3-ply, available from Caraustar, Newport, Ind.; and Manila heavy paper and MH Manila HT (high tensile) paper, available from United States Gypsum Corporation, Chicago, Ill. An exemplary back cover sheet paper is 5-ply News-Line. Exemplary face cover sheet papers include MH Manila HT (high tensile) paper and Manila 7-ply.

As used herein, the term "mat" includes mesh materials. Fibrous mats can include any suitable fibrous mat material. For example, in some embodiments, the cover sheet can be a mat made from glass fiber, polymer fiber, mineral fiber, organic fiber, or the like or combinations thereof. Polymer fibers include, but are not limited to, polyamide fibers, polyaramide fibers, polypropylene fibers, polyester fibers (e.g., polyethylene teraphthalate (PET)), polyvinyl alcohol (PVOH), and polyvinyl acetate (PVAc). Examples of organic fibers include cotton, rayon, and the like. In addition, some embodiments are substantially free of any one or more of the fibers, as described above. As used herein, "substantially free" means that the composition contains 0 wt. % based on the weight of the cover sheet of the fiber, or no fiber, or an ineffective or immaterial amount of fiber. An example of an ineffective amount is an amount below the threshold amount to achieve the intended purpose of using the fiber, as one of ordinary skill in the art will appreciate. An immaterial amount can be, e.g., 0.1% or less, 0.05% or less, 0.01% or less, 0.005% or less, or 0.001% or less fiber, based on the weight of the cover sheet, depending on the ingredient, as one of ordinary skill in the art will appreciate.

Fibrous mats employed with boards in some embodiments of the present invention are commercially available in many forms, such as woven or non-woven mats. Non-woven mats can comprise, consist essentially of, or consist of fibers bound together by a binder. The binder can be any binder typically used in the mat industry, such as urea formaldehyde, melamine formaldehyde, stearated melamine formaldehyde, polyester, acrylics, polyvinyl acetate, urea or melamine formaldehyde modified or blended with polyvinyl acetate or acrylic, styrene acrylic polymers, and the like, or combinations thereof. In addition, some embodiments are substantially free of any one or more of the binders, as described above. As used herein, "substantially free" means that the composition contains 0 wt. % based on the weight of the cover sheet of the binder, or no binder, or an ineffective or immaterial amount of binder. An example of an ineffective amount is an amount below the threshold amount to achieve the intended purpose of using the binder, as one of ordinary skill in the art will appreciate. An immaterial amount can be, e.g., 0.1% or less, 0.05% or less, 0.01% or less, 0.005% or less, or 0.001% or less binder, based on the weight of the cover sheet, depending on the ingredient, as one of ordinary skill in the art will appreciate.

The fibers of the mat can be hydrophobic or hydrophilic. They also can be coated or uncoated. Selecting a suitable type of fibrous mat will depend, in part, on the type of application in which the board is to be used. For example, when the board is used for applications that require water resistance, hydrophobic fibers can be used in the fibrous mat.

Duraglass nonwoven glass fiber mats, available from Johns-Manville, having a weight of about 1.2 lb/100 ft$^2$ (about 59 g/SQM) to about 2.0 lb/100 ft$^2$ (about 98 g/SQM), with about 40% to about 50% of the mat weight coming from the resin coating, are useful. Other useful fibrous mats include, but are not limited to, woven glass mats and non-cellulosic fabrics. In addition, some gypsum product embodiments are free of non-woven cover sheets as described above.

In embodiments where there are two cover sheets, the second cover sheet can be the same as the first, both in material and orientation relative to the core, or can have sufficiently similar expansion and contraction properties, and/or bond characteristics as the first, such that warping of the board is reduced or eliminated. In embodiments having a cover sheet including an HEHS additive, the cover sheet can have any suitable weight and caliper.

Some embodiments of the present invention are gypsum products comprising a set gypsum core at least partially covered by at least one cover sheet, with at least one of the cover sheets comprising paper and at least one high efficiency heat sink additive, e.g., aluminum trihydrate (ATH).

In some embodiments, the paper weight is in a range from about 35 lb/msf (about 0.17 kg/SQM) to about 60 lb/msf (about 0.3 kg/SQM). In some aspects, the first cover sheet has a basis weight of about 40 lb/msf (about 0.2 kg/SQM) to about 60 lb/msf (about 0.3 kg/SQM), and the second coversheet has a basis weight of about 35 lb/msf (about 0.17 kg/SQM) to about 55 lb/msf (about 0.27 kg/SQM), e.g., about 45 lb/msf (about 0.22 kg/SQM) to about 55 lb/msf (about 0.27 kg/SQM) or about 48 lb/msf (about 0.23 kg/SQM) to about 53 lb/msf (about 0.26 kg/SQM). The use of such heavy manila paper as the first cover sheet can improve the nail pull and flexure properties of panels in all applications, including ceiling applications. In some embodiments, the paper caliper is in a range from about 0.013 inches (about 0.33 mm) to about 0.018 inches (about 0.46 mm).

In some embodiments, a gypsum panel comprises, consists essentially of, or consists of a set gypsum core disposed between two cover sheets, the set gypsum core formed from at least water, stucco, and at least one HEHS additive, e.g., aluminum trihydrate, the panel having a density of about 27 lb/ft$^3$ (about 430 kg/m$^3$) to about 37 lb/ft$^3$ (about 590 kg/m$^3$) and a High Temperature Thermal Insulation Index of greater than about 17 minutes.

In some embodiments, a gypsum product, e.g., panel, has a different density from that of the panel of other embodiments. In some embodiments, the density is from about 10 lb/ft$^3$ (or "pounds per cubic foot" (pcf)) to about 40 lb/ft$^3$ or about 25 lb/ft$^3$ to about 40 lb/ft$^3$. The density can be, e.g., as listed in the table below. In the table, an "X" represents the range "from about [corresponding value in top row] to about [corresponding value in left-most column]." For example, the first "X" is the range "from about 10 lbs/ft$^3$ to about 15 lbs/ft$^3$."

|  | about 10 lb/ft$^3$ | about 15 lb/ft$^3$ | about 20 lb/ft$^3$ | about 25 lb/ft$^3$ | about 30 lb/ft$^3$ | about 35 lb/ft$^3$ |
|---|---|---|---|---|---|---|
| about 15 lb/ft$^3$ | X | | | | | |
| about 20 lb/ft$^3$ | X | X | | | | |
| about 25 lb/ft$^3$ | X | X | X | | | |
| about 30 lb/ft$^3$ | X | X | X | X | | |
| about 35 lb/ft$^3$ | X | X | X | X | X | |
| about 40 lb/ft$^3$ | X | X | X | X | X | X |

In other embodiments, the density can be, e.g., as listed in the tables below. In the table, an "X" represents the range "from about [corresponding value in top row] to about [corresponding value in left-most column]." For example, the first "X" is the range "from about 27 lbs/ft$^3$ to about 28 lbs/ft$^3$."

|  | about 27 lbs/ft$^3$ | about 28 lbs/ft$^3$ | about 29 lbs/ft$^3$ | about 30 lbs/ft$^3$ | about 31 lbs/ft$^3$ | about 32 lbs/ft$^3$ | about 33 lbs/ft$^3$ | about 34 lbs/ft$^3$ | about 35 lbs/ft$^3$ | about 36 lbs/ft$^3$ |
|---|---|---|---|---|---|---|---|---|---|---|
| about 28 lbs/ft$^3$ | X | | | | | | | | | |
| about 29 lbs/ft$^3$ | X | X | | | | | | | | |
| about 30 lbs/ft$^3$ | X | X | X | | | | | | | |
| about 31 lbs/ft$^3$ | X | X | X | X | | | | | | |
| about 32 lbs/ft$^3$ | X | X | X | X | X | | | | | |
| about 33 lbs/ft$^3$ | X | X | X | X | X | X | | | | |
| about 34 lbs/ft$^3$ | X | X | X | X | X | X | X | | | |
| about 35 lbs/ft$^3$ | X | X | X | X | X | X | X | X | | |
| about 36 lbs/ft$^3$ | X | X | X | X | X | X | X | X | X | |
| about 37 lbs/ft$^3$ | X | X | X | X | X | X | X | X | X | X |

Thus, the density can have a range between and including any aforementioned endpoints.

The ability of gypsum panels to resist fire and the associated extreme heat can be evaluated by carrying out appropriate tests. Examples of such tests that are routinely used in the construction industry include those published by Underwriters Laboratories ("UL"), such as the UL 0305, U419 and U423 test procedures and protocols, as well as procedures described in specification E119 published by the American Society for Testing and Materials (ASTM). Some of such tests comprise constructing test assemblies using gypsum panels, for example in a single-layer application of the panels on each face of a wall frame formed by wood or steel studs. Depending on the test, the assembly may or may not be subjected to load forces. The face of one side of the assembly is exposed to increasing temperatures for a period of time in accordance with a heating curve, such as those called for in the UL U305, U419 and U423 test procedures and the ASTM E119 procedures.

The temperatures proximate the heated side and the temperatures at the surface of the unheated side of the assembly are monitored during the tests to evaluate the temperatures experienced by the exposed gypsum panels and the heat transmitted through the assembly to the unexposed panels. The tests are terminated upon one or more structural failures of the panels, and/or when the temperatures on the unexposed side of the assembly exceed a predetermined threshold. Typically, these threshold temperatures are based on the maximum temperature at any one of such sensors and/or the average of the temperatures sensed by sensors on the face of the unexposed gypsum panels.

Test procedures such as those set forth in UL U305, U419 and U423, and ASTM E119 are directed to an assembly's resistance to the transmission of heat through the assembly as a whole. The tests also provide, in one aspect, a measure of the resistance of the gypsum panels used in the assembly to shrinkage in the in the x-y direction (width and length) as the assembly is subjected to high temperature heating. Such tests also provide a measure of the panels' resistance to losses in structural integrity that result in opening gaps or spaces between panels in a wall assembly, with the resulting passage of high temperatures into the interior cavities of the assembly. In another aspect, the tests provide a measure of the gypsum panels' ability to resist the transmission of heat through the panels and the assembly. It is believed that such tests reflect the specified system's capability for providing building occupants and firemen/fire control systems respectively a window of opportunity to escape or address fire conditions.

The ability of one or more gypsum products, e.g., panels, to resist the effects of heat can be assisted by the use of insulation outside the product. The use of insulation, for example, also can assist a gypsum panel in preventing the passage of heat. For example, as described above, a wall assembly can be constructed of a single-layer application of gypsum panels on each face of a wall frame formed by wood or steel studs, where such an assembly would contain space on the interior of the assembly between the studs and gypsum panels. These cavities or chambers of space can be empty (i.e., contain only air) or can be completely or partially filled (e.g., with insulation). The presence of insulation can reduce the transfer of heat through the chambers from one facing gypsum panel of the assembly to the other facing gypsum panel. Thus, insulation can be used to reduce the transfer of heat through a wall assembly as a whole.

The presence of insulation within one or more chamber(s) of an assembly can reduce the transfer of heat such that one or more gypsum panel(s) in the assembly can have a lower weight/density. As with the presence of a fire resistant additive, e.g., an HEHS additive, in the gypsum panel core, the presence of insulation outside the gypsum product, e.g., in a chamber, allows for the reduction of the stucco content of the formulation to reduce the weight and density of the gypsum product. The use of a fire resistant additive, e.g., an HEHS additive, in combination with insulation in a chamber may allow further reductions in weight/density.

The presence of insulation outside the gypsum product, as described above, is not limited to wall assemblies and is not limited to walls in general. The reduction in the weight/density of a gypsum panel can be realized in any construction where a fillable chamber is present. For example, in addition to walls, this principle applies to ceilings (e.g., with ceiling tiles), floors (e.g., with floor tiles), etc. Also, the chamber can be enclosed on more than one side by the gypsum product, e.g., a gypsum panel, or enclosed only on one side by the gypsum product.

In some embodiments, the weight of a gypsum product is reduced, while that the product still passes certain testing procedures, e.g., as described above, in the absence of outside insulation, and the same gypsum product, in the presence of outside insulation, passes additional testing procedures. Through the use of fire-resistant additives, e.g., HEHS additives, in the gypsum product and/or the use of insulation outside the product, a gypsum product can be designed such that the fire resistance is maximized and the weight/density is minimized. Such optimization can be useful in designing products that would satisfy requirements in various construction environments, e.g. commercial versus residential, where, e.g., wall assemblies may differ (the use of steel versus wood studs, stud spacing, etc.).

Any suitable insulation in any suitable amount can be used outside the gypsum product, so long as the transfer of heat is reduced. Examples of suitable insulation include mineral wool and fiberglass.

In some embodiments, a gypsum panel comprises, consists essentially of, or consists of a set gypsum core disposed between two cover sheets, the set gypsum core formed from at least water, stucco, and at least one HEHS additive, e.g., aluminum trihydrate, the panel having a density of about 27 lb/ft$^3$ (about 430 kg/m$^3$) to about 37 lb/ft$^3$ (about 590 kg/m$^3$), and the panel effective to inhibit the transmission of heat through an assembly of said panels prepared pursuant to U419 procedures wherein one surface is exposed to a heat source and an opposite unheated surface includes a plurality of sensors applied thereto such that the maximum single sensor temperature on the unheated surface is less than about 415° F. at about 30 minutes elapsed time when measured pursuant to UL U419, the heat source following a time-temperature curve in accordance with ASTM standard E119-09a, and the sensors arrayed in a pattern in accordance with UL U419 procedures.

In still other embodiments, a gypsum panel comprises, consists essentially of, or consists of a set gypsum core disposed between two cover sheets, the set gypsum core formed from at least water, stucco, and at least one HEHS additive, e.g., aluminum trihydrate, the panel having a density of about 25 lb/ft$^3$ (about 400 kg/m$^3$) to about 40 lb/ft$^3$ (about 640 kg/m$^3$), and the panel effective to inhibit the transmission of heat through an assembly of said panels prepared pursuant to UL U305, U419, and U423 procedures such that the panel satisfies at least the 30 minute, and in other embodiments the one-hour, fire-rated panel standards of UL U305, U419, and U423, respectively.

In other embodiments, a gypsum product comprises a ceiling tile including at least one HEHS additive, e.g., ATH. In some embodiments, the ceiling tiles are acoustical panels. Acoustical panels of some embodiments are prepared in a manner similar to conventional papermaking processes by water-felting dilute aqueous dispersions of mineral wool, perlite, binder, and other ingredients as desired. In such processes, the dispersion flows onto a moving foraminous support wire, such as that of a Fourdrinier or Oliver mat-forming machine for dewatering, as will be appreciated by one of ordinary skill in the art. The dispersion dewaters first by gravity drainage and then by vacuum suction. The wet mat is dried in a heated convection oven, and the dried material is cut to desired dimensions and optionally top-coated with paint to obtain the finished panel. An example of a panel, not of the present invention, prepared in this manner is the AURATONE® ceiling tile, commercially available from USG Interiors.

Acoustical panels of some other embodiments are made by a wet pulp molding or cast process. In accordance with this process, a molding composition comprising, consisting essentially of, or consisting of, e.g., granulated mineral wool fibers, fillers, colorants, a binder such as cooked starch, and water, is prepared for molding or casting the panel. The composition is placed upon suitable trays that have been covered with paper or a paper-backed metallic foil and then the composition is screeded to a desired thickness with a forming plate. The trays filled with the mineral wool composition are then placed in an oven to dry. An example of a panel, not of the present invention, prepared in this manner is the ACOUSTONE® ceiling tile, commercially available from USG Interiors. Additional details regarding such processes are provided in U.S. Pat. No. 1,769,519, incorporated herein by reference.

Acoustical panels of some other embodiments are made by using other manufacturing techniques, e.g., by forming a dilute aqueous dispersion of mineral fiber and/or aggregate and an anionically stabilized latex binder, coupling the binder solids onto the mineral fiber materials by adding a small amount of a flocculant such as a cationic polyacrylamide, and passing the slurry onto a first flooded section of the support wire to form an open, entangled, structural mass having water in interstitial spaces of the entangled mass. Water is stripped from the mass and the mass dried without collapse of the open structure by passing heated dry air through the open entangled structure. Such a process is used to manufacture, e.g., MARS™ panels available from USG Interiors. Additional details regarding such processes are provided in U.S. Pat. No. 5,250,153, incorporated herein by reference.

Acoustical panels of some other embodiments are made by using other manufacturing techniques. One process includes forming a dilute slurry mixture including, e.g., water, mineral wool, a thermoplastic binder and/or starch and distributing the dilute slurry on a porous carrier to have the slurry dewatered to a base mat by gravity drainage to remove water by gravity. A vacuum device is adjusted to gradually apply vacuum to the gravity dewatered base mat to further dewater the base mat without subjecting the mat to static pressure that would compress the base mat. The base mat is dried to form an acoustical ceiling product that has a low density and excellent acoustical absorption properties. Additional details regarding such processes are provided in U.S. Pat. No. 7,862,687, incorporated herein by reference.

The use of ATH in an acoustic ceiling tile can improve its surface burning characteristics and fire resistance. The method of application of HEHS additive(s) in a ceiling tile is through surface coating in some embodiments or through binding fibers in other embodiments. In the case of surface coating, e.g., about 0.1% to about 25% by weight of ATH, based on coating total solid weight, can be blended with other fillers and latex in the coating. The resultant coating can be sprayed or rolled onto the face of ceiling tile basemats. The mat containing wet coating can be subsequently dried in an oven set at a temperature between about 120° C. to about 250° C. In the case of binding fibers, e.g., about 0.1% to about 20% by weight of ATH, based on the weight of binding fiber, can be first blended with polymer resin in a master batch. Then, the polymer resin can be drawn into bicomponent fibers. The HEHS additive, e.g., ATH, can be either used in core or sheath of bicomponent fiber. The bicomponent fibers can be then blended with other elements of ceiling tiles. The mixture can be formed into a basemat of ceiling tiles through a wetfelt process (e.g., AURATONE® by USG Interiors), an airlay process (e.g., as described in U.S. Patent Publication Nos. 2009/0253323 and 2009/0252941, each incorporated herein by reference), or a cast process (e.g., ACOUSTONE® by USG Interiors). The binding fibers containing, e.g., ATH, can be activated through heat in an oven, e.g., temperature between about 120° C. to about 250° C.

In some embodiments, an acoustical panel includes set gypsum (i.e., calcium sulfate dihydrate) in the acoustical gypsum layer. Such an acoustical panel can include very large mechanically-formed holes that can be, for example, drilled, punched, or otherwise formed to pass through the entire depth of the panel to enhance the acoustical properties of the ceiling tile. The holes of acoustical panels of this type usually have a diameter of at least one centimeter, such as found in acoustical panels commercially available from Danoline of Valby, Denmark and from British Gypsum. In some embodiments, such a ceiling tile can include an acoustically functional backing sheet. The acoustically functional backing sheet can comprise glass fleece or a polymeric material that absorbs or dissipates sound transmitted by the large mechanically-formed holes. Ceiling panels/acoustical tiles are further described in U.S. Patent Application Publication Nos. 2007/0277948 and 2011/0319543, and U.S. Pat. Nos. 7,364,015 and 7,851,057, each of which are incorporated by reference.

In other embodiments, a gypsum product comprises a joint compound including at least one HEHS additive, e.g., ATH. The joint compound can be any joint compound used with gypsum panels in fire rated applications. In some embodiments, a joint compound comprises plaster materials that include water, calcined gypsum and other components such as, for example, fillers, thickeners, set control additives, binders, and the like, as desired to form a workable viscous slurry. The joint compound can be applied to a joint between two adjacent wallboards installed upon framing, often over a tape or mesh support. As the joint compound is applied, it is typically smoothed over the joint between the two wallboards and it is feathered over at least a portion of each of the two pieces of wallboard to hide the joint and present to the eye a uniform one-piece appearance. Quite often, several applications of the joint compound are used to achieve a desired effect.

The joint compound can be allowed to set and dry after each coat. During the setting and drying process, the calcined gypsum reacts with the water to form a matrix of hydrated gypsum or calcium sulfate dihydrate crystals. It is the desired hydration of the calcined gypsum that enables the formation of an interlocking matrix of set gypsum crystals, thereby imparting strength to the gypsum structure in the applied joint compound. After the joint compound is set and dried, the composite surface structure is typically decorated so as to create the appearance of a uniform continuous wall surface.

In a fire test, a gypsum board system can fail at a joint between gypsum boards, where the joint is filled with ready-mixed (drying type) joint compound. Lightweight joint compound can comprise, consist essentially of, or consist of inorganic fillers, calcium carbonate (calcite-$CaCO_3$) and expanded perlite, a low-density filler that can make up most of the volume of the dried product. Polyvinyl acetate (PVA) can be the principal binder. The dry joint compound can fail as the PVA begins to degrade between about 200 and about 300° F., and this polymer, as well as other polymeric additives in the joint compound, can ignite as temperatures exceed 600° F. Substitution of, e.g., ATH for calcium carbonate in the formula at levels of about 5% to about 20% by total weight of solids can delay this decomposition process considerably when a heat source is introduced, without adversely affecting the physical properties of the joint compound.

In various embodiments, the joint compound can be dry or ready-mix. A dry joint compound is provided to a user in dry powder form. The user can add water to the dry joint compound when the user is ready to use the joint compound. After the addition of water, this type of joint compound has a relatively short working time, within minutes to hours, before it cures and cannot be stored in a wetted condition.

In contrast, water is added to the components of a ready-mix joint compound during manufacturing, providing a joint compound that may be stored in a wetted state for a relatively long time (e.g., months) until used. A ready-mix compound can require little or no water to be added to the compound prior to use.

In various embodiments, a ready-mix compound can be a drying type or a setting type. A drying type compound cures upon the loss of water due to evaporation, while a setting type compound cures as a result of a chemical reaction that occurs between calcined gypsum (calcium sulfate hemihydrate) and water.

Other examples of joint compounds suitable for use with a HEHS additive are further described in U.S. Pat. Nos. 6,406,537 and 6,805,741, and U.S. Patent Publication No. 2008/0305252, each of which is incorporated by reference herein.

Gypsum products of some other embodiments comprise a gypsum fiber panel including at least one HEHS additive. The gypsum fiber panels can be manufactured using, e.g., a wet felt process or a semi-dry process. In some embodiments, ATH is beneficially added to fiber reinforced gypsum formulations used in underlayment or tile backerboard applications, where the improvements in thermal performance can be similar to those observed in gypsum wallboard. The addition of, e.g., ATH at about 5% to about 20% of the gypsum amount improves the thermal behavior and fire resistance of this product by affording additional heat sinking capacity.

One area of application is in roof cover boards. A conventional gypsum fiber roof cover board may have restricted applications due to its limited fire performance when tested under UL 790 procedures, wherein the cover board is evaluated for its ability to protect a combustible wood deck under intermittent flames with temperature well over 1000° F. and stationary burning brands. Incorporating at least one HEHS additive, e.g., ATH, into a gypsum fiber board can improve its thermal performance under UL 790 procedures relative to a gypsum fiber board without the HEHS additive(s).

In some embodiments, a gypsum fiber board including at least one HEHS additive in accordance with the present invention can be made as taught by U.S. Pat. Nos. 5,817,262 and/or 5,320,677, each of which is incorporated by reference herein. In general, the process for making the composite gypsum/fiber material begins with mixing between about 0.5% to about 30%, and preferably between 3% to 20%, by weight, wood fibers with the respective complement of ground, uncalcined gypsum. The dry mix is combined with enough liquid, preferably water, to form a dilute slurry having about 70% to about 95% by weight water. The slurry can be processed in a pressure vessel, such as an autoclave, at a temperature of approximately 285 to 305° F., which is sufficient to convert the gypsum to acicular calcium sulfate hemihydrate crystals. It is desirable to continuously agitate the slurry with gentle stirring or mixing to break up any fiber clumps and keep all the particles in suspension. After the hemihydrate has formed and has precipitated out of solution as hemihydrate crystals, the pressure on the product slurry can be relieved when the slurry is discharged from the autoclave. It is at this point that any other desired additives can be added to the slurry. While still hot, the slurry can be added to a head box which distributes the slurry onto a porous felting conveyor. While on the conveyor, the slurry can be dewatered by the action of vacuum pumps which draw the water through the felting conveyor, causing a filter cake to form on the conveyors surface. As much as 90% of the uncombined water may be removed from the filter cake by vacuum pumps. The temperature of the heated slurry can be maintained at a temperature above about 160° F. until it has been substantially dewatered and wet pressed into a board. As a consequence of the water removal, the filter cake can be cooled to a temperature at which point rehydration may begin. However, it may still be necessary to provide external cooling to bring the temperature low enough to accomplish the rehydration within an acceptable time.

Before extensive rehydration takes place, the filter cake can be wet-pressed into a board of desired thickness and/or density. If the board is to be given a special surface texture or a laminated surface finish, it can occur during or following this step of the process. During the wet pressing, which can take place with gradually increasing pressure to preserve the products integrity, two things happen: (1) additional water, for example about 50%-60% of the remaining water, can be removed; and (2) as a consequence of the additional water removal, the filter cake can be further cooled to a temperature at which rapid rehydration occurs. The calcium sulfate hemihydrate hydrates to gypsum, so that the acicular calcium hemihydrate crystals are converted to gypsum crystals in-situ in and around the wood fibers. After rehydration is complete, the boards can be cut and trimmed, if desired, and then sent through a kiln for drying. The drying temperature can be kept low enough to avoid recalcining any gypsum on the surface.

In some other embodiments, a cement based product comprises a structural cementitious panel including at least one HEHS additive, e.g., ATH. In some embodiments, the cementitious panel includes at least one or more layers of cementitious binder interspersed with discrete fiber reinforcement or between layers of mesh reinforcing. In some embodiments, the reinforcing is fiberglass mesh or the equivalent which can be applied from a roll in sheet fashion upon or between layers of settable slurry. Gypsum-cement compositions are generally described in U.S. Pat. Nos. 5,685,903; 5,858,083; 5,958,131; the contents of each are incorporated by reference herein. Structural cement panels may be formed through a multi layer process in the manner described in U.S. Pat. No. 7,445,738, incorporated by reference herein.

Structural cementitious panels currently made at about ¾" thickness can comprise approximately two-thirds gypsum in their binder formulation, with the rest being Portland cement, silica fume and lime. The gypsum fraction renders the panel with its excellent fire performance, surface burning and non-combustible characteristics. The replacement (or addition) of a portion of this gypsum with an HEHS additive, e.g., ATH at about 5 to about 20% by weight based on the weight of stucco further enhances the thermal performance of this product which allows for the manufacture of thinner sections. Thinner sections inclusive of sizes about ¼" to about ⅝" can be used in wall, sheathing and roof applications, where lighter and thinner products with reasonable strength are desired. The HEHS additive, e.g., ATH, can be added as part of the formulation together with all dry powders prior to being blended into a slurry, and being a filler, it has no impact on slurry fresh properties or hardened strength.

Gypsum products as described herein can comprise, consist essentially of, or consist of at least one HEHS additive and the following components, taken individually or in any combination.

Stuccos—The stucco (or calcined gypsum) component used to form the crystalline matrix of the gypsum core typically comprises, consists essentially of, or consists of beta calcium sulfate hemihydrate, water-soluble calcium sulfate anhydrite, alpha calcium sulfate hemihydrate, or mixtures of any or all of these, from natural or synthetic sources. In some embodiments, the stucco includes non-gypsum minerals, such as minor amounts of clays or other components that are associated with the gypsum source or are added during the calcination, processing and/or delivery of the stucco to the mixer.

By way of example, the amounts of stucco referenced in Table Ia in FIG. 1 assume that the gypsum source has at least about a 95% purity. Accordingly, the components, and their relative amounts, such as those mentioned in Table I above, used to form the core slurry may be varied or modified depending on the stucco source, purity and content. For example, the composition of the gypsum core slurry and the amount of high expansion vermiculite used can be modified for different stucco compositions depending on the gypsum purity, the natural or synthetic source for the gypsum, the stucco water content, the stucco clay content, etc.

High Expansion Particulates—Reduced weight and density gypsum products, e.g., panels, formed in accordance with the present invention can achieve unique and unexpected results in terms of resistance to fire and the associated extreme heat conditions, without relying on increased quantities of gypsum hemihydrates typical of conventional fire rated gypsum panels or relying predominantly on conventional, relatively low expansion vermiculite, such as that referred to as "Grade No. 5" unexpanded vermiculite (with a typical particle size of less than about 0.0157 inches (about 0.40 mm)). For example, some embodiments of panels the present invention can utilize high expansion particulates in the form of vermiculite with a high volume of expansion relative to Grade No. 5 vermiculite (U.S. grading system) and other low expansion vermiculites which have been used in commercial fire rated gypsum panels.

The vermiculites referred to herein as "high expansion vermiculite" have a volume expansion after heating for one hour at about 1560° F. (about 850° C.) of about 300% or more of their original volume. In contrast, Grade No. 5 unexpanded vermiculite typically has a volume expansion at about 1560° F. (about 850° C.) of about 225%. Other particulates with properties comparable to high expansion vermiculite also can be utilized in some embodiments of the present invention, as well. In some embodiments, high expansion vermiculites can be used that have a volume expansion of about 300% to about 380% of their original volume after being placed for one hour in a chamber having a temperature of about 1560° F. (about 850° C.).

One such high expansion vermiculite is often referred to as Grade No. 4 unexpanded vermiculite (U.S. grading system) (such high expansion vermiculites were rejected as a useful ingredient in fire rated gypsum wallboard in U.S. Pat. No. 3,454,456). In some embodiments, at least about 50% of the particles in the high expansion vermiculite used in products of the present invention are larger than about 50 mesh (i.e. greater than about 0.0117 inch (about 0.297 mm) openings). In other embodiments, at least about 70% of the particles are larger than about 70 mesh (i.e. larger than about 0.0083 inch (about 0.210 mm) openings).

In other embodiments, high expansion vermiculites can be used that are classified under different and/or foreign grading systems. Such high expansion vermiculites should have substantially similar expansion and/or thermal resistance characteristics typical of those discussed herein. For example, in some embodiments, a vermiculite classified as European, South American, or South African Grade 0 (micron) or Grade 1 (superfine) can be used.

In some embodiments, a high expansion vermiculite can be used which comprises, consists essentially of, or consists of a particle distribution in which up to about 50% of the vermiculite particles are less than about 500 micrometers, up to about 60% of the vermiculite particles are between about 500 micrometers and about 1000 micrometers, up to about 40% of the vermiculite particles are between about 1000 micrometers and about 1500 micrometers, and up to about 20% of the vermiculite particles are between about 1500 micrometers and about 3000 micrometers. In some embodiments, a high expansion vermiculite can comprise, consist essentially of, or consist of a vermiculite particles according to the following distribution: between about 25% and about 45% of the particles are less than about 500 micrometers, between about 40% and 60% of the particles are between about 500 micrometers and about 1000 micrometers, up to about 20% of the particles are between about 1000 micrometers and about 1500 micrometers, and up to about 10% of the particles are between about 1500 micrometers and about 3000 micrometers. In yet other embodiments, a high expansion vermiculite can comprise, consist essentially of, or consist of a vermiculite particles according to the following distribution: between about 5% and about 20% of the particles are less than about 500 micrometers, between about 35% and 60% of the particles are between about 500 micrometers and about 1000 micrometers, between about 20% and about 40% of the particles are between about 1000 micrometers and about 1500 micrometers, and up to about 20% of the particles are between about 1500 micrometers and about 3000 micrometers.

In yet other embodiments, vermiculites that have been chemically treated or otherwise modified such that they exhibit volume expansion behavior under heating similar to the high expansion vermiculites discussed herein also can be used. The high expansion vermiculate useful in products, e.g., panels, some embodiments of the present invention comprise, consist essentially of, or consist of a other vermiculites, vermiculite mixes and/or vermiculite containing compositions (and other particle sizes and size distributions), as well as other particulate materials with comparable expansion properties that provide the panel shrinkage and expansion characteristics typical of the panels disclosed herein. Other suitable high expansion vermiculites and other particulates also may differ from those disclosed herein in respects that are not material to providing the reduced weight and density, fire resistant gypsum products disclosed herein.

In some embodiments, high expansion vermiculite used in the reduced weight and density, fire resistant gypsum products of the present invention comprise, consist essentially of, or consist of a commercial U.S. grade 4 vermiculite commercially-available through a variety of sources. Each of the commercial producers can provide specifications for physical properties of the high expansion vermiculite, such as Mohs hardness, total moisture, free moisture, bulk density, specific ratio, aspect ratio, cation exchange capacity, solubility, pH (in distilled water), expansion ratio, expansion temperature, and melting point, for example. It is contemplated that in different embodiments using different sources of high expansion vermiculites, these physical properties will vary.

In some embodiments, the high expansion vermiculate particles are generally distributed throughout the core portion of the gypsum products. In other embodiments, the high expansion vermiculite particles are generally evenly distributed throughout the core portion of the gypsum products.

The high expansion vermiculite can be generally randomly distributed throughout the reduced density portions of the product core. In some embodiments, it is desirable to have a different vermiculite distribution in the denser portions of a product, e.g., panel, such as in the mentioned increased density gypsum layer adjacent the panel face(s) or in portions of the core with greater density along the panel edges. In other embodiments, the high expansion vermiculite is substantially excluded from those denser portions of the panels, such as hardened edges and faces of the panels. Such variations in vermiculite particle contents and distribution in the denser portions of the panels may be as a result of drawing core slurry from the core slurry mixer for use in those portions of the panel, by introduction of the vermiculite through other appropriate means into the slurry for the reduced density core portions of the panel, by using edge mixers, or other means known to those skilled in the art.

There further can be considerable variation in the amount of high expansion particles distributed throughout the core, and in the specific distribution of the particles in some embodiments of products of the present invention relative to the distribution of particles in other products. Such variations in amount and distribution of the high expansion particles will depend on the amount and type of the vermiculite or other particles incorporated in the slurry, the high expansion particle size and size distribution, the core slurry composition, and the core slurry mixing and distribution procedures, among other factors. Similarly, the distribution of the specific particles, particle properties and particle sizes within the core can vary and can depend on similar factors during the mixing and distribution of the core slurry during the product forming process.

In some embodiments, the high expansion particle distribution avoids instances of large concentrations of the high expansion particles in portions of the product core that significantly reduce the structural strength and integrity of the core during normal use of the products or during high temperature and/or fire conditions. This would not include minor variations encountered in typical commercial production. The high expansion particle distribution also can be modified in terms of the concentration of the particles in one or more portions of the core for specific desired applications of the products.

In some embodiments, the distribution of the high expansion particles in the reduced density core of the products occurs during the mixing of the core slurry, passage of the slurry to the first coversheet and/or the distribution of the slurry across the cover sheet. In some embodiments, the high expansion particles are added to the core slurry mixer with other dry or semi-dry materials during the mixing and preparation of the core slurry. Alternatively, in some other embodiments, high expansion particles are added in other procedures, steps or stages which generally distribute the high expansion particles within the desired portions of the product gypsum core.

In addition, it is contemplated that some embodiments are substantially free of any one or more of the high expansion particulates, e.g., vermiculite, as described above. As used herein, "substantially free" means that the composition contains 0 wt. % based on the weight of stucco of high expansion particulate, or no high expansion particulate, or an ineffective or immaterial amount of high expansion particulate. An example of an ineffective amount is an amount below the threshold amount to achieve the intended purpose of using the high expansion particulate, as one of ordinary skill in the art will appreciate. An immaterial amount can be, e.g., 0.1% or less, 0.05% or less, 0.01% or less, 0.005% or less, or 0.001% or less high expansion particulate, based on the weight of the stucco, depending on the ingredient, as one of ordinary skill in the art will appreciate.

Starches—As will be appreciated by one skilled in the art, embodiments of the core slurry formulation for use in preparing gypsum products, e.g., panels, of some embodiments of the present invention comprise, consist essentially of, or consist of a starch. In some embodiments of panels of the present invention, and the methods for preparing such panels, the core slurry formulation, such as mentioned in Table Ia in FIG. 1, includes a pregelatinized starch or a functionally-equivalent starch. Raw starch can be pregelatinized by cooking the starch in water at temperatures of at least 185° F. or by other well known methods for causing gel formation in the starch utilized in the product core. The starch may be incorporated in the core slurry in a dry form, a predispersed liquid form, or combinations of both. In a dry form, a starch can be added to the core slurry mixer with other dry ingredients or in a separate addition procedure, step or stage. In the predispersed form, it may be added with other liquid ingredients, such as gauging water, for example, or in a separate addition procedure, step or stage.

Some examples of readily available pregelatinized starches that can be used in the practice of the present invention are commercially available pre-gelled yellow corn flour starch from Cargill, Inc. or from Archer Daniels Midland Co. In some embodiments, the starch component comprises, consists essentially of, or consists of at least pregelatinized corn starch, such as pregelatinized corn flour available from Bunge Milling, St. Louis, Mo. Such pregelatinized starches have the following typical characteristics: moisture about 7.5%, protein about 8.0%, oil about 0.5%, crude fiber about 0.5%, ash about 0.3%; having a green strength of about 0.48 psi; and having a bulk density of about 35 lb/ft$^3$ (about 560 kg/m$^3$). In yet other embodiments, the core slurry formulation comprises, consists essentially of, or consists of a one or more commercially available hydroxyethylated starches suitable for the purposes of the present invention.

In some embodiments, the core slurry formulation includes a hydroxyethylated starch. As used herein, a "hydroxyethylated starch" is a native, modified, or treated starch that has been reacted with a suitable reagent to functionalize a portion of the free hydroxyl groups on the starch with hydroxyethyl groups. Hydroxyethylated starches are sometimes referred to as ethylated starches. A starch can be modified or treated, either before or after hydroxyethylation, by, e.g., dextrinization, acid modification, enzymatic modification, mechanical shear, etherification, esterification, cross linking, cationization, and the like, or any combination thereof.

In some embodiments, the hydroxyethylated starch commercially available from Grain Processing Corporation of Muscatine, Iowa, and marketed as COATMASTER® K98F ethylated corn starch can be used. In other embodiments, a hydroxyethylated starch commercially available from Pac-Moore Products, Hammond, Ind., and marketed as S-Size 30 G can be used. In other embodiments, the starch can be 2015 Gum or 2040 Gum from Tate & Lyle. In still other embodiments, another suitable hydroxyethylated starch can be used which comprises a modified corn starch having the following typical analysis: moisture from 10 to 13%, a pH from 5.0 to 7.5, a particle size from 95% through 100 mesh, a specific gravity of about 1.50, a molecular weight of greater than about 10,000 g/mol, and a bulk density of about 35 pcf (about 560 kg/m$^3$). Any of the above starches can be used individually or in combination. In yet other embodiments, other hydroxyethylated starches can be used individually or in combination. See also, U.S. Patent Application Publication No. 2008/0070026, incorporated herein by reference.

In other embodiments, the gypsum product comprises, consists essentially of, or consists of other useful starches, including acid-modified starches, such as acid-modified corn flour available as HI-BOND from Bunge Milling, St. Louis, Mo. This starch has the following typical characteristics: moisture about 10.0%, oil about 1.4%, cold water solubles about 17.0%, alkaline fluidity about 98.0%, bulk density about 30 lb/ft$^3$ (about 480 kg/m$^3$), and about a 20% slurry producing a pH of about 4.3. Another useful starch is non-pregelatinized wheat starch, such as ECOSOL-45, available from ADM/Ogilvie, Montreal, Quebec, Canada.

In some embodiments, the gypsum product comprises, consists essentially of, or consists of more than one of the kinds of starches described herein. In other embodiments, the gypsum product comprises, consists essentially of, or consists of one or more starches that can be modified in more than one way. For example, as described above, a starch can be hydroxyethylated and, e.g., acid-modified. Also, as another example, a raw starch can be cooked to effect pregelatinization and then acid-modified. As yet another example, a starch can be hydroxyethylated, pregelatinized, and acid-modified. As described above, any of the starches of the gypsum product can be modified in one or more ways as described herein.

In addition, some embodiments are substantially free of any one or more of the starches, e.g., pregelatinized starches, as described above. As used herein, "substantially free" means that the composition contains 0 wt. % based on the weight of stucco of starch, or no starch, or an ineffective or immaterial amount of starch. An example of an ineffective amount is an amount below the threshold amount to achieve the intended purpose of using the starch, as one of ordinary skill in the art will appreciate. An immaterial amount can be, e.g., 0.1% or less, 0.05% or less, 0.01% or less, 0.005% or less, or 0.001% or less starch, based on the weight of the stucco, depending on the ingredient, as one of ordinary skill in the art will appreciate.

Fibers—In some embodiments incorporating fibers such as mentioned in Table Ia in FIG. 1, and the methods for preparing such panels, the fibers comprise, consist essentially of, or consist of mineral fibers, carbon and/or glass fibers and mixtures of such fibers, as well as other comparable fibers providing comparable benefits to the panel. In some embodiments, glass fibers are incorporated in the gypsum core slurry and resulting crystalline core structure. The glass fibers in some of such embodiments can have an average length of about 0.5 inches (about 13 mm) to about 0.75 inches (about 19 mm) and a diameter of about 11 microns to about 17 microns. In other embodiments, such glass fibers can have an average length of about 0.5 (about 13 mm) to about 0.675 inches (about 17 mm) and a diameter of about 13 microns to about 16 microns. In yet other embodiments, E-glass fibers are utilized having a softening point above about 800° C. and one such fiber type is Advantex® glass fibers (available from Owens Corning) having a softening point above at least about 900° C. Mineral wool or carbon fibers such as those know to those of ordinary skill can be used in place of or in combination with glass fibers, such as those mentioned herein.

In addition, some embodiments are substantially free of any one or more of the fibers as described above. As used herein, "substantially free" means that the composition contains 0 wt. % based on the weight of stucco of fiber, or no fiber, or an ineffective or immaterial amount of fiber. An example of an ineffective amount is an amount below the threshold amount to achieve the intended purpose of using the fiber, as one of ordinary skill in the art will appreciate. An immaterial amount can be, e.g., 0.1% or less, 0.05% or less, 0.01% or less, 0.005% or less, or 0.001% or less fiber, based on the weight of the stucco, depending on the ingredient, as one of ordinary skill in the art will appreciate.

Phosphates—In some embodiments, a phosphate salt or other source of phosphate ions such as mentioned in Table Ia in FIG. 1 is added to the gypsum slurry used to produce the gypsum product, e.g., a panel gypsum core. The gypsum product comprises, consists essentially of, or consists of the phosphate. The use of such phosphates can contribute to providing a gypsum core with increased strength, resistance to permanent deformation (e.g., sag resistance), and dimensional stability, compared with set gypsum formed from a mixture containing no phosphate. In some of such embodiments, the phosphate source is added in amounts to provide dimensional stability, or wet strength, to the product and product core while the gypsum hemihydrate in the core hydrates and forms the gypsum dihydrate crystalline core structure (for example during the time between the forming plate and the kiln section of the formation process). Additionally, it is noted that to the extent that the added phosphate acts as a retarder, an appropriate accelerator can be added at the required level to overcome any adverse retarding effects of the phosphate. The phosphates usually are added in a dry form and/or a liquid form, with the dry ingredients typically added to the core slurry mixer and the liquid ingredients added to the mixer or in other stages or procedures.

Phosphate-containing components useful in the present invention include water-soluble components and can be in the form of an ion, a salt, or an acid, namely, condensed phosphoric acids, each of which comprises two or more phosphoric acid units; salts or ions of condensed phosphates, each of which comprises two or more phosphate units; and monobasic salts or monovalent ions of orthophosphates, such as described, for example, in U.S. Pat. Nos. 6,342,284; 6,632,550; and 6,815,049, the disclosures of all of which are incorporated herein by reference. Suitable examples of such classes of phosphates will be apparent to those skilled in the art. For example, any suitable monobasic orthophosphate-containing compound can be utilized in the practice of principles of the present invention, including, but not limited to, monoammonium phosphate, monosodium phosphate, monopotassium phosphate, and combinations thereof. A preferred monobasic phosphate salt is monopotassium phosphate.

Similarly, any suitable water-soluble polyphosphate salt can be used in accordance with the present invention. The polyphosphate can be cyclic or acyclic. Exemplary cyclic polyphosphates include, for example, trimetaphosphate salts and tetrametaphosphate salts. The trimetaphosphate salt can be selected, for example, from sodium trimetaphosphate (also referred to herein as STMP), potassium trimetaphosphate, lithium trimetaphosphate, ammonium trimetaphosphate, and the like, or combinations thereof.

Also, any suitable water-soluble acyclic polyphosphate salt can be utilized in accordance with the present invention. The acyclic polyphosphate salt has at least two phosphate units. By way of example, suitable acyclic polyphosphate salts in accordance with the present invention include, but are not limited to, pyrophosphates, tripolyphosphates, sodium hexametaphosphate having from about six to about 27 repeating phosphate units, potassium hexametaphosphate having from about six to about 27 repeating phosphate units, ammonium hexametaphosphate having from about six to about 27 repeating phosphate units, and combinations thereof. A preferred acyclic polyphosphate salt pursuant to the present invention is commercially available as CALGON® from ICL Performance Products LP, St. Louis, Mo., which is a sodium hexametaphosphate having from about six to about 27 repeating phosphate units.

Preferably, the phosphate-containing compound is selected from the group consisting of sodium trimetaphosphate having the molecular formula $(NaPO_3)_3$, sodium hexametaphosphate having from about six to about 27 repeating phosphate units and having the molecular formula $Na_{n+2}P_nO_{3n+1}$ wherein n=6-27, tetrapotassium pyrophosphate having the molecular formula $K_4P_2O_7$, trisodium dipotassium tripolyphosphate having the molecular formula $Na_3K_2P_3O_{10}$, sodium tripolyphosphate having the molecular formula $Na_5P_3O_{10}$, tetrasodium pyrophosphate having the molecular formula $Na_4P_2O_7$, aluminum trimetaphosphate having the molecular formula $Al(PO_3)_3$, sodium acid pyrophosphate having the molecular formula $Na_2H_2P_2O_7$, ammonium polyphosphate having 1000-3000 repeating phosphate units and having the molecular formula $(NH_4)_{n+2}P_nO_{3n+1}$ wherein n=1000-3000, or polyphosphoric acid having two or more repeating phosphoric acid units and having the molecular formula $H_{n+2}P_nO_{3n+1}$ wherein n is two or more. Sodium trimetaphosphate is most preferred and is commercially available from ICL Performance Products LP, St. Louis, Mo.

In addition, some embodiments are substantially free of any one or more of the phosphates, e.g., sodium trimetaphosphate, as described above. As used herein, "substantially free" means that the composition contains 0 wt. % based on the weight of stucco of phosphate, or no phosphate, or an ineffective or immaterial amount of phosphate. An example of an ineffective amount is an amount below the threshold amount to achieve the intended purpose of using the phosphate, as one of ordinary skill in the art will appreciate. An immaterial amount can be, e.g., 0.001% or less, 0.0005% or less, or 0.0001% or less phosphate, based on the weight of the stucco, depending on the ingredient, as one of ordinary skill in the art will appreciate.

Dispersants—In other embodiments, dispersants such as those mentioned in Table Ia in FIG. 1, can be included in the gypsum core slurry. The gypsum products described herein can comprise, consist essentially of, or consist of the dispersant. The dispersants can be added in a dry form with other dry ingredients and/or a liquid form with other liquid ingredients in the core slurry mixer or in other steps or procedures.

In some embodiments, such dispersants can include naphthalenesulfonates, such as polynaphthalenesulfonic acid and its salts (polynaphthalenesulfonates) and derivatives, which are condensation products of naphthalenesulfonic acids and formaldehyde. Such desirable polynaphthalenesulfonates include sodium and calcium naphthalenesulfonate. The average molecular weight of the naphthalenesulfonates can range from about 3,000 to 27,000, although it is preferred that the molecular weight be about 8,000 to 10,000. At a given solids percentage aqueous solution, a higher molecular weight dispersant has a higher viscosity, and generates a higher water demand in the formulation, than a lower molecular weight dispersant.

Useful naphthalenesulfonates include DILOFLO, available from GEO Specialty Chemicals, Cleveland, Ohio; DAXAD, available from Hampshire Chemical Corp., Lexington, Mass.; and LOMAR D, available from GEO Specialty Chemicals, Lafayette, Ind. The naphthalenesulfonates are preferably used as aqueous solutions in the range of about 35% to about 55% by weight solids content, for example. It is most preferred to use the naphthalenesulfonates in the form of an aqueous solution, for example, in the range of about 40% to about 45% by weight solids content. Alternatively, where appropriate, the naphthalenesulfonates can be used in dry solid or powder form, such as LOMAR D, for example.

Alternatively, in other embodiments, dispersants known to those skilled in the art useful for improving fluidity in gypsum slurries can be employed, such as polycarboxylate dispersants. A number of polycarboxylate dispersants, particularly polycarboxylic ethers, are preferred types of dispersants. One preferred class of dispersants used in the slurry includes two repeating units and is described further in U.S. Pat. No. 7,767,019, which is entitled, "Gypsum Products Utilizing a Two-Repeating Unit System and Process for Making Them," and is incorporated herein by reference. Examples of these dispersants are products of BASF Construction Polymers, GmbH (Trostberg, Germany) and supplied by BASF Construction Polymers, Inc. (Kennesaw, Ga.) (hereafter "BASF") and are hereafter referenced as the "PCE211-Type Dispersants." A particularly useful dispersant of the PCE211-Type Dispersants is designated PCE211 (hereafter "211"). Other polymers in this series useful in the present invention include PCE111. PCE211-Type dispersants are described more fully in U.S. Ser. No. 11/827,722 (Pub. No. US 2007/0255032A1), filed Jul. 13, 2007 and entitled, "Polyether-Containing Copolymer," which is incorporated herein by reference.

The molecular weight of one type of such PCE211 Type dispersants may be from about 20,000 to about 60,000 Daltons. It has been found that the lower molecular weight dispersants cause less retardation of set time than dispersants having a molecular weight greater than 60,000 Daltons. Generally longer side chain length, which results in an increase in overall molecular weight, provides better dispensability. However, tests with gypsum indicate that efficacy of the dispersant is reduced at molecular weights above 50,000 Daltons.

Another class of polycarboxylate compounds that are useful as dispersants in this invention is disclosed in U.S. Pat. No. 6,777,517, which is incorporated herein by reference and hereafter referenced as the "2641-Type Dispersant." Examples of PCE211-Type and 2641-Type Dispersants are manufactured by BASF Construction Polymers, GmbH (Trostberg, Germany) and marketed in the United States by BASF Construction Polymers, Inc. (Kennesaw, Ga.). Preferred 2641-Type Dispersants are sold by BASF as MELFLUX 2641F, MELFLUX 2651F and MELFLUX 2500L dispersants.

Yet another preferred dispersant family is sold by BASF and referenced as "1641-Type Dispersants." The 1641-Type dispersant is more fully described in U.S. Pat. No. 5,798,425, which is incorporated herein by reference. One of such 1641-Type Dispersants is marketed as MELFLUX 1641F dispersant by BASF. Other dispersants that can be used include other polycarboxylate ethers such as COATEX Ethacryl M, available from Coatex, Inc. of Chester, S.C., and lignosulfonates, or sulfonated lignin. Lignosulfonates are water-soluble anionic polyelectrolyte polymers, byproducts from the production of wood pulp using sulfite pulping. One example of a lignin useful in the present invention is Marasperse C-21 available from Reed Lignin Inc., Greenwich, Conn.

In addition, some embodiments are substantially free of any one or more of the dispersants, e.g., naphthalenesulfonate, as described above. As used herein, "substantially free" means that the composition contains 0 wt. % based on the weight of stucco of dispersant, or no dispersant, or an ineffective or immaterial amount of dispersant. An example of an ineffective amount is an amount below the threshold amount to achieve the intended purpose of using the dispersant, as one of ordinary skill in the art will appreciate. An immaterial amount can be, e.g., 0.1% or less, 0.05% or less, 0.01% or less, 0.005% or less, or 0.001% or less dispersant, based on the weight of the stucco, depending on the ingredient, as one of ordinary skill in the art will appreciate.

Retarders/Accelerators—Set retarders (up to about 2 lb/MSF (approx. 9.8 g/m$^2$) in ⅝ inch thick panels) or dry accelerators (up to about 35 lb/MSF (approx. 170 g/m$^2$) in ⅝ inch thick panels) can be added to some embodiments of the core slurry to modify the rate at which the stucco hydration reactions take place. The gypsum products as described herein can comprise, consist essentially of, or consist of a retarder/accelerator. "CSA" is an example of a preferred set accelerator including about 95% calcium sulfate dihydrate co-ground with about 5% sugar and heated to 250° F. (1-21° C.) to caramelize the sugar. CSA is available from USG Corporation, and can be made according to U.S. Pat. No. 3,573,947, which is incorporated herein by reference. Potassium sulfate is another example of a preferred accelerator. "HRA," which is another exemplary preferred accelerator, is calcium sulfate dihydrate freshly ground with sugar at a ratio of about 5 to about 25 pounds of sugar per 100 pounds of calcium sulfate dihydrate. HRA is further described in U.S. Pat. No. 2,078,199, which is incorporated herein by reference.

Another accelerator known as wet gypsum accelerator, or "WGA," is also a preferred accelerator. A description of the use of, and a method for making, wet gypsum accelerator is disclosed in U.S. Pat. No. 6,409,825, which is incorporated herein by reference. This accelerator includes at least one additive selected from the group consisting of an organic phosphonic compound, a phosphate-containing compound or mixtures thereof. This particular accelerator exhibits substantial longevity and maintains its effectiveness over time such that the wet gypsum accelerator can be made, stored, and even transported over long distances prior to use. The wet gypsum accelerator can be used in amounts ranging from about 5 to about 80 pounds per thousand square feet (approx. 24.3 to 390 g/m$^2$) of ⅝ inch thick wallboard product.

In addition, some embodiments are substantially free of any one or more of the retarders/accelerators, as described above. As used herein, "substantially free" means that the composition contains 0 wt. % based on the weight of stucco of retarder/accelerator, or no retarder/accelerator, or an ineffective or immaterial amount of retarder/accelerator. An example of an ineffective amount is an amount below the threshold amount to achieve the intended purpose of using the retarder/accelerator, as one of ordinary skill in the art will appreciate. An immaterial amount can be, e.g., 0.1% or less, 0.05% or less, 0.01% or less, 0.005% or less, or 0.001% or less retarder/accelerator, based on the weight of the stucco, depending on the ingredient, as one of ordinary skill in the art will appreciate.

Foams—Foam can be introduced into the core slurry in amounts that provide the reduced core density and product weight. The gypsum products described herein can comprise, consist essentially of, or consist of foam. The introduction of foam in the core slurry in the proper amounts, formulations and processes can produce a desired network and distribution of air voids, and walls between the air voids, within the core of the final dried products. In some embodiments, the air void sizes, distributions and/or wall thickness between air voids provided by the foam composition and foam introduction system are in accordance with those discussed herein, as well as those that provide comparable density, strength and related properties to the products. This air void structure permits the reduction of the gypsum and other core constituents and the core density and weight, while substantially maintaining (or in some instances improving) the product strength properties, such as core compressive strength, and the panel rigidity, flexural strength, nail pull resistance, among others.

In some embodiments, at a nominal panel thickness of about ⅝-inch, a gypsum panel of the present invention, and the methods for making same, provide a panel that has a nail pull resistance, determined according to ASTM standard C473-09, of at least about 70 lb (about 32 kg). In other embodiments, the panel can have a nail pull resistance, determined according to ASTM standard C473-09, of at least about 85 lb (about 39 kg).

In some such embodiments, the mean equivalent sphere diameter of the air voids can be at least about 75 μm, and in other embodiments at least about 100 μm. In some other embodiments, the mean equivalent sphere diameter of the air voids can be from about 75 μm to about 400 μm. In yet other embodiments, the mean equivalent sphere diameter of the air voids can be from about 100 μm to about 350 μm with a standard deviation from about 100 to about 225. In other embodiments, the mean equivalent sphere diameter of the air voids can be from about 125 μm to about 325 μm with a standard deviation from about 100 to about 200.

In some embodiments, from about 15% to about 70% of the air voids comprise, consist essentially of, or consist of an equivalent sphere diameter of about 150 μm or less. In other embodiments, from about 45% to about 95% of the air voids comprise, consist essentially of, or consist an equivalent sphere diameter of about 300 μm or less, and from about 5% to about 55% of the air voids comprise, consist essentially of, or consist an equivalent sphere diameter of about 300 μm or more. In other embodiments, from about 45% to about 95% of the air voids comprise, consist essentially of, or consist an equivalent sphere diameter of about 300 μm or less, and from about 5% to about 55% of the air voids comprise, consist essentially of, or consist an equivalent sphere diameter from about 300 μm to about 600 μm. In the discussion of average air void sizes herein, voids in the gypsum core that are about 5 μm or less are not considered when calculating the number of air voids or the average air void size.

In those and some other embodiments, the thickness, distribution and arrangement of the walls between the voids in such embodiments, alone and/or in combination with a desired air void size distribution and arrangement, also permit a reduction in the product core density and weight, while substantially maintaining (or in some instances improving) the product strength properties. In some such embodiments, the average thickness of the walls separating the air voids can be at least about 25 μm. In some embodiments, the walls defining and separating air voids within the gypsum core comprise, consist essentially of, or consist of an average thickness from about 25 μm to about 200 μm, from about 25 μm to about 75 μm in other embodiments, and from about 25 μm to about 50 μm in still other embodiments. In yet other embodiments, the walls defining and separating air voids within the gypsum core comprise, consist essentially of, or consist of an average thickness from about 25 μm to about 75 μm with a standard deviation from about 5 to about 40. In yet other embodiments, the walls defining and separating air voids within the gypsum core comprise, consist essentially of, or consist of an average thickness from about 25 µm to about 50 µm with a standard deviation from about 10 to about 25.

Without being bound by theory, it is believed that embodiments with the discussed air void size distributions and arrangements, and wall thicknesses and distributions, assist in improving a gypsum product's high temperature properties, e.g., when used with the high expansion vermiculite disclosed herein. It is believed that the foam void and wall thickness assist in reducing or substantially resist the creation of substantial faults in the gypsum core structure when the high expansion vermiculite expands at high temperature conditions.

Examples of the use of foaming agents to produce desired void and wall structures include those discussed in U.S. Pat. No. 5,643,510, the disclosure of which is incorporated by reference herein. In some embodiments, a combination of a first more stable foaming agent and a second less stable foaming agent can be used in the core slurry mixture. In other embodiments, only one type of foaming agent is used, so long as the desired density and product strength requirements are satisfied. The approaches for adding foam to a core slurry are known in the art and examples of such an approach is discussed in U.S. Pat. Nos. 5,643,510 and 5,683,635, each disclosure of which is incorporated by reference herein.

In addition, some embodiments are substantially free of any one or more of the foams, as described above. As used herein, "substantially free" means that the composition contains 0 wt. % based on the weight of stucco of foam, or no foam, or an ineffective or immaterial amount of foam. An example of an ineffective amount is an amount below the threshold amount to achieve the intended purpose of using the foam, as one of ordinary skill in the art will appreciate. An immaterial amount can be, e.g., 0.1% or less, 0.05% or less, 0.01% or less, 0.005% or less, or 0.001% or less foam, based on the weight of the stucco, depending on the ingredient, as one of ordinary skill in the art will appreciate.

Siloxanes—In some embodiments, the water resistance of gypsum products, e.g., panels, of the present invention can be improved by adding a polymerizable siloxane to the slurry used to make the panels. The gypsum products can comprise, consist essentially of, or consist of siloxanes. Preferably, the siloxane is added in the form of an emulsion. The slurry is then shaped and dried under conditions which promote the polymerization of the siloxane to form a highly cross-linked silicone resin. A catalyst which promotes the polymerization of the siloxane to form a highly cross-linked silicone resin can be added to the gypsum slurry.

Preferably, the siloxane is generally a fluid linear hydrogen-modified siloxane, but can also be a cyclic hydrogen-modified siloxane. Such siloxanes are capable of forming highly cross-linked silicone resins. Such fluids are well known to those of ordinary skill in the art and are commercially available and are described in the patent literature. Typically, the linear hydrogen modified siloxanes useful in the present invention comprise, consist essentially of, or consist of those having a repeating unit of the general formula:

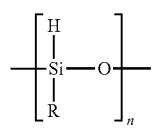

wherein R represents a saturated or unsaturated mono-valent hydrocarbon radical. In preferred embodiments, R represents an alkyl group, and most preferably R is a methyl group. During polymerization, the terminal groups can be removed by condensation and siloxane groups are linked together to form the silicone resin. Cross-linking of the chains can also occur. The resulting silicone resin imparts water resistance to the gypsum matrix as it forms.

Preferably, a solventless methyl hydrogen siloxane fluid sold under the name SILRES BS 94 by Wacker-Chemie GmbH (Munich, Germany) is used as the siloxane. The manufacturer indicates this product is a siloxane fluid containing no water or solvents. About 0.3 to about 1.0% of the BS 94 siloxane can be used, based on the weight of the dry ingredients. It is preferred to use from about 0.4% to about 0.8% of the siloxane based on the dry stucco weight.

The siloxane can be formed into an emulsion or a stable suspension with water. A number of siloxane emulsions are contemplated for use in this slurry. Emulsions of siloxane in water are also available for purchase, but they may include emulsifying agents that tend to modify properties of the gypsum articles, such as the paper bond in gypsum products. Emulsions or stable suspensions prepared without the use of emulsifiers are therefore preferred. Preferably, the suspension will be formed in situ by mixing the siloxane fluid with water. The siloxane suspension is maintained in a stable condition until used and remains well dispersed under the conditions of the slurry. The siloxane suspension or emulsion is maintained in a well dispersed condition in the presence of the optional additives, such as set accelerators, that may be present in the slurry. The siloxane suspension or emulsion is maintained so that it remains stable through the steps in which the gypsum products are formed as well. Preferably, the suspension remains stable for more than 40 minutes. More preferably, it remains stable for at least one hour. The term "emulsion" is intended to include true emulsions and suspensions that are stable at least until the stucco is about 50% set.

The siloxane polymerization reaction proceeds slowly on its own, requiring that the products be stored for a time sufficient to develop water-resistance prior to shipping. Catalysts are known to accelerate the polymerization reaction, reducing or eliminating the time needed to store gypsum products as the water-resistance develops. Use of dead-burned magnesium oxide for siloxane polymerization is described in U.S. Pat. No. 7,892,472, entitled "Method of Making Water-Resistant Gypsum-Based Article," which is incorporated herein by reference. Dead-burned magnesium oxide is water-insoluble and interacts less with other components of the slurry. It accelerates curing of the siloxane and, in some cases, causes the siloxane to cure more completely. It is commercially available with a consistent composition. A particularly preferred source of dead-burned magnesium oxide is BAYMAG 96. It has a BET surface area of at least 0.3 m²/g. The loss on ignition is less than about 0.1% by weight. The magnesium oxide is preferably used in amounts of about 0.1% to about 0.5% based on the dry stucco weight.

There are at least three grades of magnesium oxide on the market, depending on the calcination temperature. "Dead-burned" magnesium oxide is calcined between 1500° C. and 2000° C., eliminating most, if not all, of the reactivity. MagChem P98-PV (Martin Marietta Magnesia Specialties, Bethesda, Md.) is an example of a "dead-burned" magnesium oxide. BayMag 96 (Baymag, Inc. of Calgary, Alberta, Canada) and MagChem 10 (Martin Marietta Magnesia Specialties, Bethesda, Md.) are examples of "hard-burned"

magnesia. "Hard-burned" magnesium oxide is calcined at temperatures from 1000° C. to about 1500° C. It has a narrow range of reactivity, a high density, and is normally used in application where slow degradation or chemical reactivity is required, such as in animal feed and fertilizer. The third grade is "light-burn" or "caustic" magnesia, produced by calcining at temperatures of about 700° C. to about 1000° C. This type of magnesia is used in a wide range of applications, including plastics, rubber, paper and pulp processing, steel boiler additives, adhesives and acid neutralization. Examples of light burned magnesia include BayMag 30, BayMag 40, and BayMag 30 (−325 Mesh) (BayMag, Inc. of Calgary, Alberta, Canada).

As mentioned in U.S. Pat. No. 7,803,226, which is incorporated herein by reference, preferred catalysts are made of a mixture of magnesium oxide and Class C fly ash. When combined in this manner, any of the grades of magnesium oxide are useful. However, dead-burned and hard-burned magnesium oxides are preferred due to their reduced reactivity. The relatively high reactivity of magnesium oxides, can lead to cracking reactions which can produce hydrogen. As the hydrogen is generated, the product expands, causing cracks where the stucco has set. Expansion also causes breakdown of molds into which the stucco is poured, resulting in loss of detail and deformation of the product in one or more dimensions. Preferably, BayMag 96, MagChem P98-PV and MagChem 10 are the preferred sources of magnesium oxide. Preferably, the magnesium oxide and fly ash are added to the stucco prior to their addition to the gauging water. Dry components such as these are often added to the stucco as it moves along a conveyer to the mixer.

A preferred fly ash is a Class C fly ash. Class C hydraulic fly ash, or its equivalent, is the most preferred fly ash component. A typical composition of a Class C fly ash is shown in Table I of U.S. Pat. No. 7,803,226. High lime content fly ash, greater than about 20% lime by weight, which is obtained from the processing of certain coals. ASTM designation C-618, herein incorporated by reference herein, describes the characteristics of Class C fly ash. A preferred Class C fly ash is supplied by Bayou Ash Inc., Big Cajun, II, Louisiana. Preferably, fly ash is used in amounts of about 0.1% to about 5% based on the dry stucco weight. More preferably, the fly ash is used in amounts of about 0.2% to about 1.5% based on the dry stucco weight.

Catalysis of the siloxane results in faster and more complete polymerization and cross-linking of siloxane to form the silicone resin. Hydration of the stucco forms an interlocking matrix of calcium sulfate dihydrate crystals. While the gypsum matrix is forming, the siloxane molecules are also forming a silicone resin matrix. Since these are formed simultaneously, at least in part, the two matrices become intertwined in each other. Excess water and additives to the slurry, including the fly ash, magnesium oxide and additives described below, which were dispersed throughout the slurry, become dispersed throughout the matrices in the interstitial spaces to achieve water resistance throughout the product core. In some embodiments, suitable amounts of a pregelatinized starch, or functionally-equivalent starch, can work in conjunction with the siloxane to retard water entry along the more vulnerable edges of the product.

In addition, some embodiments are substantially free of any one or more of the siloxanes, as described above. As used herein, "substantially free" means that the composition contains 0 wt. % based on the weight of stucco of siloxane, or no siloxane, or an ineffective or immaterial amount of siloxane. An example of an ineffective amount is an amount below the threshold amount to achieve the intended purpose of using the siloxane, as one of ordinary skill in the art will appreciate. An immaterial amount can be, e.g., 0.1% or less, 0.05% or less, 0.01% or less, 0.005% or less, or 0.001% or less siloxane, based on the weight of the stucco, depending on the ingredient, as one of ordinary skill in the art will appreciate.

In some embodiments, the core slurry formulation for use in preparing products of the present invention can comprise, consist essentially of, or consist of a combination of pregelatinized starch (or functionally-equivalent starch) in an amount greater than about 2% by weight based on the weight of stucco and siloxane in an amount of at least about 0.4%, and preferably at least about 0.7% by weight based on the weight of stucco, which can produce gypsum products with less than about 5% water absorption. This water resistance property can be particularly helpful since a reduced-density product has far more of its total volume comprising air and/or water voids than a conventional product. The increased void volume would be expected to make the light weight products far more water absorbent. While not wishing to be bound by theory, it is believed that water resistance develops when the siloxane cures within the formed products and that the at least about 2.0% by weight pregelatinized starch works in conjunction with the siloxane to slow water entry through micropores on the product edges first by blocking water entry and then, upon take-up of water by the starch by forming a highly viscous starch/water combination. In other embodiments, a hydroxyethylated starch or a starch that is functionally equivalent to a pregelatinized starch can be used in combination with the siloxane.

In some embodiments, the gypsum products include other suitable additives, such as those additives commonly used to produce gypsum products. The gypsum products described herein can comprise, consist essentially of, or consist of these additives. Such additives include, without limitation, structural additives such as mineral wool, perlite, clay (e.g., kaolin), carbonates (e.g., calcium carbonate), polyester or other polymers, silicones, as well as chemical additives such as foaming agents, fillers, sugar, borates (ulexite, colemanite, etc.), boric acid, and the like, binders (e.g., starch and latex), non-HENS additive pigments or colorants, fungicides, biocides, amide compounds (for example, sulphate-urea complex, carbonate-urea complex, borate-urea complex or a magnesium-urea complex), and the like. Examples of the use of some of these and other additives are described, for instance, in U.S. Pat. Nos. 6,342,284; 6,632,550; 6,800,131; 5,643,510; 5,714,001; and 6,774,146; and U.S. Patent Application Publication Nos. 2004/0231916 A1; 2002/0045074 A1 and 2005/0019618 A1, each of which is incorporated by reference herein. In addition, some embodiments are substantially free of any one or more of the additives as described above. As used herein, "substantially free" means that the composition contains 0 wt. % based on the weight of stucco of additive, or no additive, or an ineffective or immaterial amount of additive. An example of an ineffective amount is an amount below the threshold amount to achieve the intended purpose of using the additive, as one of ordinary skill in the art will appreciate. An immaterial amount can be, e.g., 0.1% or less, 0.05% or less, 0.01% or less, 0.005% or less, or 0.001% or less additive, based on the weight of the stucco, depending on the ingredient, as one of ordinary skill in the art will appreciate. The gypsum products can also be substantially free of carbides.

Gypsum board of some embodiments of the present invention can possess desirable strength characteristics yet be ultralight, for example, made according to U.S. Patent Application Publication Nos. 2007/0048490, 2008/0090068, an/or 2011/0195241, each of which is incorporated by reference herein. Also, it also is contemplated that ratios of parameters are integral to any embodiment, for example, the ratio of TI to dry weight or the ratio of TI to density. It is contemplated that any parameter described herein can be further determined as a ratio of any other parameter described herein, either as an individual value based on one value for each of two different parameters or as an overall value based on several values for each of two different parameters (such as when plotting one value against another to determine a mathematical relationship such as a linear slope). Such ratios can be used to determine the increase in one parameter necessary, e.g., to compensate or allow for the reduction of another parameter, or to determine the limits of reduction in one parameter that still provides acceptable values in another parameter.

A gypsum product that comprises wallboard in some embodiments of the present invention can be manufactured using techniques that are well known in the art. For example, U.S. Pat. No. 7,364,676 discloses a process which includes a continuously moving layer of facer material (e.g., cover sheet) for receiving the continuous deposition of slurry from a mixer, a mixer for preparing slurry, and a forming station. Manufacture of mat-faced board is described, for example, in co-pending, commonly assigned U.S. Pat. Appl. Pub. Nos. US 2008/0190062, US 2009/0029141, and US 2010/0143682, each incorporated by reference herein. Briefly, the process typically involves discharging a facer material onto a conveyor, or onto a forming table that rests on a conveyer, which is then positioned under the discharge conduit (e.g., a gate-canister-boot arrangement as known in the art, or an arrangement as described in U.S. Pat. Nos. 6,494,609 and 6,874,930) of a mixer. As one of ordinary skill in the art will appreciate, board products are typically formed "face down" such that the first facer material serves as the "face" of the board after it is installed. The components of the cementitious composition slurry are fed to the mixer comprising the discharge conduit, where they are agitated to form the slurry. Foam can be added in the discharge conduit (e.g., in the gate as described, for example, in U.S. Pat. Nos. 5,683,635 and 6,494,609). The slurry is discharged onto the facer material. The slurry is spread, as necessary, over the facer material. See, e.g., U.S. Pat. No. 7,364,676. For a multilayered core board, the first core layer can be applied directly onto the facer material, or a skim coat can be applied to the facer material prior to applying. A skim coat is a very thin, very dense layer of a cementitious composition that assists in bonding the facer material to the core layer, as discussed herein, the slurry of which also may form the edges of the board, as is described in U.S. Patent Application Publication No. 2010/0247937, which is incorporated by reference herein. Briefly, in some embodiments, the slurry for the skim coat is applied to the facing material and then spread on the facing material by a roller. The roller is often narrower than the width of the facing material, such that excess skim slurry collects on the facing material between the ends of the roller and the ends of the facing material. This skim coat slurry forms the edges of the board. Alternatively, separate edge hoses may be used for disposing the edges. Additional details regarding skim coats are provided in U.S. Pat. No. 7,736,720, incorporated herein by reference.

In some embodiments, the slurry is disposed between a first cover sheet and a second cover sheet to form a wet assembly that is a panel precursor. In this respect, as used herein "disposed between" will be understood to mean that skim coat can be optionally applied or included between the core and one or both cover sheets such that it will be understood that a cover sheet can include skim coat.

By extension, gypsum panels of some embodiments of the present invention can be used in assemblies that are effective to inhibit the transmission of heat therethrough to meet the one-hour fire-resistance rating to be classified as Type X board under ASTM 1396/C 1396M-06. In some other embodiments, assemblies can be constructed using gypsum panels of the present invention that conform to the specification of other UL assemblies, such as UL U419 and U423, for example. In yet other embodiments, gypsum panels of the present invention can be used in other assemblies that are substantially equivalent to at least one of U305, U419, and U423. Such assemblies can pass the thirty minute, in some embodiments, and the one-hour, in other embodiments, fire rating and applicable hose stream testing for U305, U419, U423, and other equivalent fire test procedures.

Thus, in an embodiment, gypsum product comprises a set gypsum core at least partially covered by at least one cover sheet; at least one of the cover sheets comprising paper and aluminum trihydrate.

In another embodiment, the gypsum product is a gypsum panel, and the set gypsum core is disposed between two cover sheets.

In another embodiment, the aluminum trihydrate is present in an amount effective to increase the High Temperature Thermal Insulation Index of the gypsum product relative to the High Temperature Thermal Insulation Index of the gypsum product without the aluminum trihydrate.

In another embodiment, the paper is formed from at least paper pulp and the aluminum trihydrate.

In another embodiment, the aluminum trihydrate is present in an amount of from about 5% to about 40% by weight of the paper pulp when dry.

In another embodiment, the paper comprises at least a partial coating of aluminum trihydrate.

In another embodiment, the paper further comprises magnesium hydroxide.

In another embodiment, the set gypsum core comprises a gypsum crystal matrix, and the panel has a density of about 35 pcf (about 560 kg/m$^3$) or less.

In another embodiment, the panel has a density of about 27 lb/ft$^3$ (about 430 kg/m$^3$) to about 37 lb/ft$^3$ (about 590 kg/m$^3$) and a High Temperature Thermal Insulation Index of greater than about 17 minutes, the High Temperature Thermal Insulation Index determined according to ASTM Publication WK25392.

In another embodiment, the panel has a density of about 27 lb/ft$^3$ (about 430 kg/m$^3$) to about 37 lb/ft$^3$ (about 590 kg/m$^3$), and the panel is effective to inhibit the transmission of heat through an assembly of said panels prepared pursuant to UL U419 procedures wherein one surface is exposed to a heat source and an opposite unheated surface includes a plurality of sensors applied thereto such that the maximum single sensor temperature on the unheated surface is less than about 415° F. at about 30 minutes elapsed time when measured pursuant to UL U419, the heat source following a time-temperature curve in accordance with ASTM standard E119-09a, and the sensors arrayed in a pattern in accordance with UL U419 procedures.

In another embodiment, the assembly comprises insulation between said panels.

In another embodiment, gypsum panel comprises a set gypsum core disposed between two cover sheets, the set gypsum core formed from at least water, stucco, and aluminum trihydrate, the panel having a density of about 27 lb/ft$^3$ (about 430 kg/m$^3$) to about 37 lb/ft$^3$ (about 590 kg/m$^3$)

and a High Temperature Thermal Insulation Index of greater than about 17 minutes, the High Temperature Thermal Insulation Index determined in accordance with ASTM Publication WK25392.

In another embodiment, the aluminum trihydrate is present in an amount of from about 2% to about 10% by weight of the stucco.

In another embodiment, at least one cover sheet is paper formed from at least paper pulp and aluminum trihydrate.

In another embodiment, the cover sheet comprises at least a partial coating of aluminum trihydrate.

In another embodiment, gypsum panel comprises a set gypsum core disposed between two cover sheets, the set gypsum core formed from at least water, stucco, and aluminum trihydrate, the panel having a density of about 27 lb/ft$^3$ (about 430 kg/m$^3$) to about 37 lb/ft$^3$ (about 590 kg/m$^3$), and the panel is effective to inhibit the transmission of heat through an assembly of said panels prepared pursuant to UL U419 procedures wherein one surface is exposed to a heat source and an opposite unheated surface includes a plurality of sensors applied thereto such that the maximum single sensor temperature on the unheated surface is less than about 415° F. at about 30 minutes elapsed time when measured pursuant to UL U419, the heat source following a time-temperature curve in accordance with ASTM standard E119-09a, and the sensors arrayed in a pattern in accordance with UL U419 procedures.

In another embodiment, the aluminum trihydrate is present in an amount of from about 2% to about 10% by weight of the stucco.

In another embodiment, at least one cover sheet is paper formed from at least paper pulp and aluminum trihydrate.

In another embodiment, the cover sheet comprises at least a partial coating of aluminum trihydrate.

In another embodiment, the assembly comprises insulation between said panels.

It shall be noted that the preceding are merely examples of embodiments. Other exemplary embodiments are apparent from the entirety of the description herein. It will also be understood by one of ordinary skill in the art that each of these embodiments may be used in various combinations with the other embodiments provided herein.

EXAMPLES

The following example further illustrates the invention but, of course, should not be construed as in any way limiting its scope.

Example 1

This example demonstrates the use of one preferred HEHS additive, ATH, in the formulation of paper used as cover sheets for gypsum board.

Samples of handsheet were made in which ATH was added at 0 (control), 5, 10, 15, 20 and 50% by weight replacement of dry pulp. The pulp comprised recycled corrugated waste paper made into a slurry, to which a sizing agent and the indicated amount of ATH were added. This slurry was then dewatered over a fine screen and rolled to form thin sheets of 12"×12" size, which were then dried at a temperature of approximately 200° F. These sheets were subsequently used as back paper in the making of board samples.

The board core formulation was the same in all samples and consisted of a water-stucco ratio of 2.15, heat-resistant accelerator (HRA) at 1%, pre-gelled starch at 0.7%, ver-miculite at 7%, sodium trimetaphosphate at 0.14%, naphthalene sulfonate dispersant at 0.13% and glass fiber at 0.5% (all percentages are by weight of stucco). The face paper basis weight was 52 lbs/msf in all board samples. Following casting, the 12"×12" board samples (at ⅝ inch thickness) were then dried at 110° F. until constant weight, which for the given formulation parameters, resulted in board weights of approximately 1600-1635 lbs/MSF.

The following test was performed in accordance with ASTM Pub. WK25392. For thermal performance, four 4" discs were extracted from the board samples away from the edges for thermal insulation testing. This test measured the heat shielding capacity of the gypsum board sample and involved sandwiching a thermocouple between two discs of the board in question. This assembly was then placed in a furnace at 500° C. for 75 mins, and the time required for the thermocouple temperature to rise from 40° C. to 200° C. was recorded as the "thermal insulation (TI)" time in minutes. For the 4 discs taken from each board sample, two assemblies were tested.

The average TI for each of the conditions above is shown in FIG. 2. FIG. 2 shows the board weights in lb/msf for each condition, where weight consistency is seen among the boards. Overall, an approximately monotonic increase in TI with increasing ATH content was measured in this test series: At ATH contents under 20%, TI increased at a rate of approximately 0.8 min. (48 sec.) for every 10% increase in ATH. Beyond 20% ATH, improvements in TI diminished, indicating that 20% was likely optimal for this particular series.

Example 2

This example demonstrates the use of a preferred HEHS additive, ATH, in the formulation of slurry for gypsum panels.

Laboratory studies were conducted concerning the effectiveness of one preferred HEHS additive, aluminum trihydrate (ATH), used in gypsum core formulations useful in some preferred embodiments of the present invention. The properties of the sample panels made using those formulations were evaluated in terms of High Temperature Thermal Insulation Index ("TI"), and High Temperature Shrinkage ("SH %") and High Temperature Thickness Expansion ("TE %"). In Examples 2A, 2B and 2C discussed herein, core formulations were prepared using varying amounts of stucco, high-expansion vermiculite, ATH, heat-resistant accelerator ("HRA"), pregelatinized starch, sodium trimetaphosphate, glass fibers, naphthalenesulfonate dispersant, and water according to the formulations discussed in each Example for the core formulations Samples 1 to 20.

The amounts of each component are provided in "parts" by weight, which may be in pounds, grams or other units of measure. Where a value for a component in a core formulation is expressed as a percentage, this refers to the amount of the component relative to the stucco component as a percentage by weight. Where the amount of component is expressed in terms of pounds per thousand square feet (lb/msf), the reported value is an approximate, calculated equivalent to the amount by weight of the component in a thousand square feet of panel about ⅝ inch thick (approx. 0.625 inches, 15.9 mm), based on the amount by weight of the component in the formulation.

For each sample formulations, the dry ingredients were combined with the water in a Waring mixer to provide consistent, well-mixed gypsum slurry. Then, two approximately 12 inch by 12 inch (30.5 cm by 30.5 cm) panels, about ⅝ inch thick (approx. 0.625 inches, 15.9 mm), were formed with each sample formulations. To form the panels, the slurries from each sample formulation were hand cast between an upper layer paper of about 48 lb/msf and a lower layer paper of about 42 lb/msf.

Each of the cast panels was allowed to set until hydration of the stucco was substantially completed and then was dried at about 350° F. (about 177° C.) for about 20 minutes and about 110° F. (about 40° C.) for about 48 hours. The water content of the formulation was used to provide the indicated weight and density of the set, dried hand cast samples. Foam was not added to the sample formulations. The approximate values for the following are reported in FIGS. 3, 5, and 6, Tables IIa to IVb, for the panels formed from formulations Samples 1 to 20: panel density (pounds per cubic foot), high expansion vermiculite %, the approximate stucco weight in lb/msf, approximate ATH %, and the approximate weight of ATH in lb/msf.

From each panel, ten four-inch disks were cut. Two sets (four disks of the ten disks) were used for the High Temperature Thermal Insulation Index tests. The remaining six disks were used for the High Temperature Shrinkage and High Temperature Thickness Expansion tests. The High Temperature Thermal Insulation Index results are the average of two readings (i.e. the average of the readings from each of the two sets). The reported High Temperature Shrinkage and High Temperature Thickness Expansion percentages are an average of six readings (i.e. the average of the readings from six disks). The High Temperature Thermal Insulation Index testing (reported in minutes) was conducted using the protocol described in ASTM Pub. WK25392 and discussed below. High Temperature Shrinkage and High Temperature Thickness Expansion testing (reported in % change in dimensions) was done using the protocols described in ASTM Pub. WK25392 and discussed below. The data from this testing is reported in the tables in FIGS. 3, 5, and 6 in terms of the average of the results from each set of tested disks (i.e. the average of the two sets of disks tested for TI and of the averages from the six disks tested for shrinkage and expansion).

The High Temperature Thermal Insulation Index ("TI") testing discussed in Examples 2A to 2C demonstrates that a given amount of ATH by weight is more efficient in increasing the High Temperature Thermal Insulation Index than an equivalent amount of stucco by weight. With or without the presence of high-expansion vermiculite, these test results show that generally about 40 to 50 lbs/msf of ATH can provide a similar thermal insulation protection as about 100 lbs/msf of stucco or more (this stucco amount may vary by stucco source and purity). This testing also demonstrates that ATH can be used with high expansion vermiculite without any significant adverse effect on High Temperature Shrinkage and High Temperature Thickness Expansion properties of the panels. The panels of Examples 2A to 2C generally continued to exhibit High Temperature Shrinkage values of about 10% or less and a ratio (TE/S) of High Temperature Thickness Expansion (z-direction) to High Temperature Shrinkage of about 0.2 or more. In some formulations, the data also indicates that the ATH additive improves the High Temperature Shrinkage and High Temperature Thickness Expansion properties of the panels. While these tests were conducted on laboratory-created samples, it is expected that comparable results would be achieved using full production formulations and process that include the addition of foam in the core formulation to produce air voids in the set gypsum core of the dried panels.

Example 2A

In this example, a stucco (stucco A) prepared from a synthetic gypsum source was used to prepare the core formulations for Samples 1 through 9. Gypsum panels produced with this synthetic gypsum stucco typically evidence greater high temperature shrinkage relative to panels formed from high purity, natural gypsum. The base core formulation was made using the following approximate amounts by weight: 600 parts (Samples 1 to 8) or 579 parts (Sample 9) stucco A; 6 parts HRA; 4.2 parts pregelatinized starch; 0.84 parts sodium trimetaphosphate; 0 parts (Sample 1) or 42 parts (Samples 2 to 9) high expansion vermiculite (0% or 7% by weight of the stucco, respectively); 3 parts glass fibers; 0.8 parts naphthalenesulfonate dispersant; 0 parts (Sample 1), 12 parts (Sample 4), 21.1 parts (Samples 2, 5 and 9), 30 parts (Sample 6), 42.2 parts (Sample 7), and 60 parts (Sample 8) ATH (2%, 4%, 5%, 7% and 10% by weight stucco, respectively); and 1290 parts water.

Each of the core formulations Samples 1 through 9 were cast into panels and tested for High Temperature Thermal Insulation Index, High Temperature Shrinkage, and High Temperature Thickness Expansion. The cast and dried panels from each of the sample formulations had the approximate values for density, high expansion vermiculite content, stucco, ATH, and TI reported in Tables IIa and IIb, FIGS. 3A and 3B, respectively. Table IIa also reports the difference between core formulations having no ATH (Sample 1), and having 4% ATH with a reduced stucco content (Sample 2), both without high expansion vermiculite. Table IIb similarly reports the difference between a core formulation having no ATH (Sample 3), and the TI values for the core formulations having increasing amounts of ATH with decreasing amounts of stucco (Samples 4 to 9), all of which contained 7% high expansion vermiculite. Table IIc, FIG. 3C, reports the approximate density, high expansion vermiculite %, ATH %, the High Temperature Shrinkage results, and the High Temperature Thickness Expansion results for the panels made from each of the core formulations Samples 1 to 9.

Table IIa shows that ATH can be added in an amount (here 4% by weight of stucco) that is effective to increase the TI of the panels by about one minute, notwithstanding a stucco reduction of about 20 pounds/msf. This benefit was achieved without the use of high expansion vermiculite. Table IIb shows the effect of core formulations, Samples 3 to 9, with increasing amounts of ATH relative to the stucco content, from 0% to as high as 10%, in conjunction with the use of high expansion vermiculite at 7% by weight of the stucco.

Figure 4:
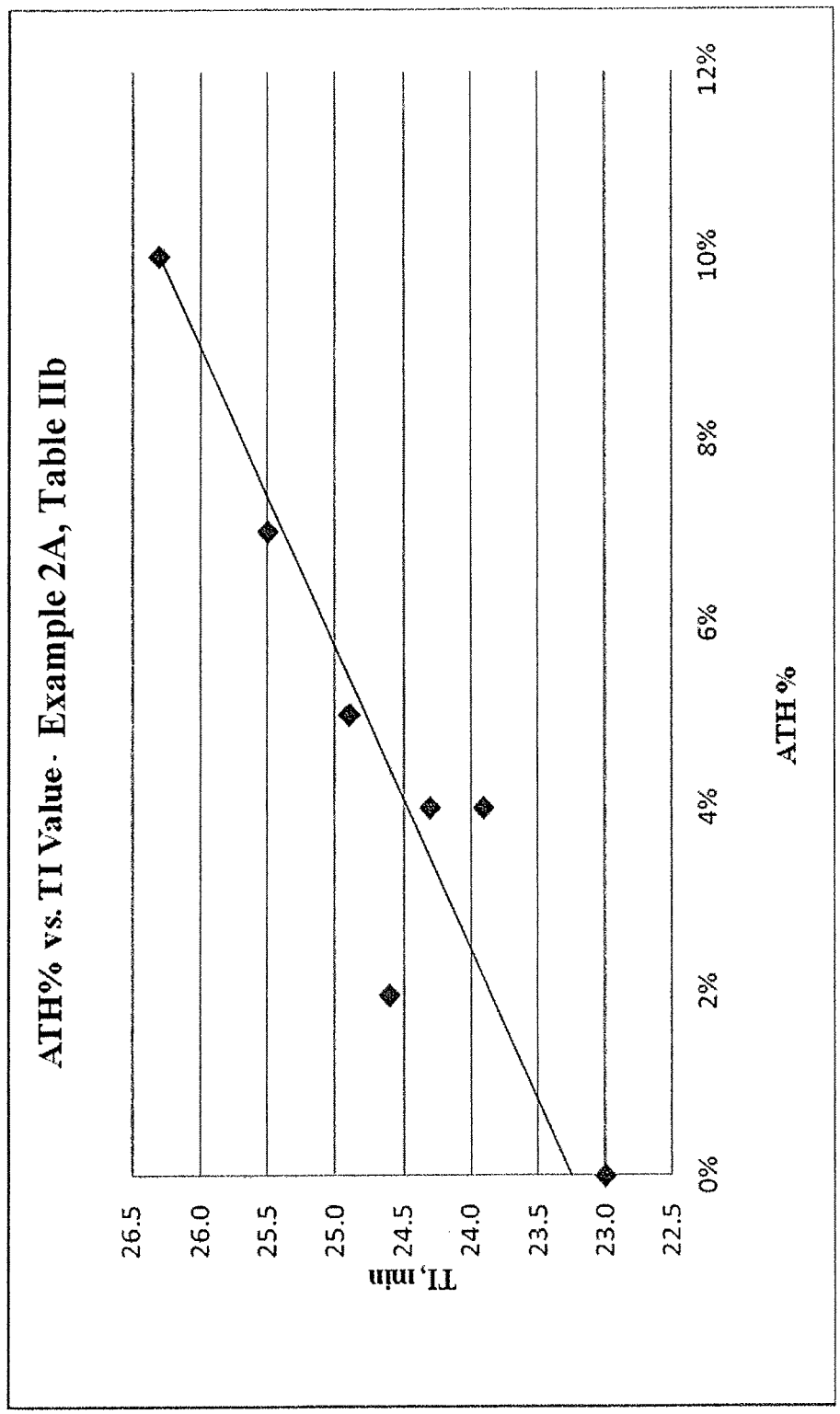
FIG. 4 is a plot of the amount of ATH as a percentage weight by weight of the stucco versus the High Temperature Thermal Insulation Index (TI) taken from testing data in Table IIb of FIG. 3a for Example 2A, Samples 3-9, in accordance with some embodiments of the present invention.

The Sample formulations 3 to 9 provided an increase in TI from about 23 to about 26 minutes. The effect of the addition of ATH in these formulations is further summarized in FIG. 4, which plots ATH % versus the TI in minutes of the panels made with Sample formulations 3 to 9. As shown in FIG. 4 and Table IIb, with up to about 5% ATH, the TI of Sample formulations 3 to 6 increased by as much as about two minutes, notwithstanding a reduction of the amount of stucco in the core formulation of about 25 lb/msf in Samples 5 and 6. Similarly, the TI increased as much as about 3.3 minutes in Sample formulation 8, with 10% ATH and a reduction about 15 lbs/msf of stucco. The test results from each of the sets of Samples with the same approximate stucco content—Samples 5 and 6, and 7 and 8—also show that increasing the amount of ATH provides an increase in TI values.

The formulation Samples 3 to 9 with ATH also show improvements in High Temperature Shrinkage and High Temperature Thickness Expansion results. Formulation Sample 1 without ATH and without high expansion vermiculite had High Temperature Shrinkage of about 19% and a High Temperature Thickness Expansion of about −24%. With the addition of 4% ATH in Sample 2, the High Temperature Shrinkage improved to about 9%, and the High Temperature Thickness Expansion improved to about −11.5%. The addition of about 7% high expansion vermiculite to Samples 3 to 9 show a further improvement in High Temperature Shrinkage to about 5% and in High Temperature Thickness Expansion to about 18%, notwithstanding a significant stucco reduction (e.g. Sample 8).

Furthermore, the formulation of Sample 9 shows that it is possible to achieve a desired TI at or above 23 minutes, while reducing the formulation's stucco content by at least about 75 lb/msf, using about 4% ATH and about 7% high expansion vermiculite. The formulation Sample 9 also shows that a core formulation with such a reduced stucco content can improve High Temperature Shrinkage properties by reducing the shrinkage percentage at least about 12% and High Temperature Thickness Expansion properties by increasing the expansion percentage by about 30% or more. A comparison of the panels made with the formulation Samples 3 and 9, and Samples 4 and 5 shows that ATH may be substituted for stucco at a ratio of about 1 one part ATH to at least about 1.7 to about 2 parts stucco, while maintaining similar TI properties. The substitution ratios may vary considerably depending on the source of the stucco and the core formulations. Moreover, for a given stucco formulation, the substitution ratios can be increased if a reduction in TI is desired or decreased if greater TI properties are desired.

Example 2B

In this example, a stucco (stucco B) prepared from relative high purity natural gypsum source (at least about 90% gypsum) was used to prepare the core formulations for Samples 10 through 17. The base core formulation was made using the following approximate amounts by weight: 1000 parts stucco B; 10 parts HRA; 7 parts pregelatinized starch; 1.4 parts sodium trimetaphosphate; 70 parts high expansion vermiculite (about 7% by weight of stucco); 5 parts glass fibers; 1.4 parts naphthalenesulfonate dispersant; 0 parts (Sample 10), 17.6 parts (Sample 11), 35.2 parts (Sample 12 and 17), and 70.4 parts (Samples 13 to 16) ATH (2%, 4%, and 7% by weight of the stucco, respectively); and 1800 parts (Samples 10 to 14), 1900 parts (Sample 15) and 2150 parts (Samples 16 and 17) water.

Each of the core formulations Samples 10 through 17 were cast into panels and tested for High Temperature Thermal Insulation Index, High Temperature Shrinkage, and High Temperature Thickness Expansion. The cast and dried panels from each of the Sample formulations had the approximate values for density, high expansion vermiculite content, stucco, ATH %, TI reported in FIGS. 5A and 5B, Tables IIIa and IIIb, respectively. Table IIIa reports the difference between a core formulation, made using stucco B, with no ATH (Sample 10), and the TI values for core formulations with increasing amounts of ATH and no change in the stucco content (Samples 11 to 14). Each of those formulations contained about 7% high expansion vermiculite. Table IIIb reports the differences in TI results between core formulations with about 7% (Samples 15 and 16) and about 4% (Sample 17) ATH. The equivalent of about 100 lb/msf stucco was removed from the formulations Samples 16 and 17, and all of those samples contained 7% high expansion vermiculite. Table IIIc, FIG. 5C, reports the density, high expansion vermiculite content, ATH % and the High Temperature Shrinkage and High Temperature Thickness Expansion results for the panels made from each of the core formulations Samples 10 to 17.

Table IIIa shows the benefit of adding an amount of ATH (here 2%, 4% and 7%) that is effective to result in a TI increase with a constant stucco content, here from about 0.1 to about 1.5 minutes. Table IIIb shows the effect of core formulation Samples 15 and 16 where the ATH % is held constant and 100 pounds of stucco is removed. This produced a TI reduction of 1.3 minutes, but with a TI in excess of about 24 minutes, both Samples 15 and 16 would be acceptable for fire rated applications. Sample 17 similarly shows that the ATH amount can be reduced to about 4%, and the stucco amount in the core formulation can be reduced the equivalent of about 100 lb/msf, while maintaining a TI of about 23 minutes. This also is considered acceptable for fire rated applications. The results in Table IIIb show that an effective amount of ATH can be used to maintain the TI at a predetermined level (e.g., about 23 minutes) while lowering the amount of stucco used in the formulation.

Table IIIc, FIG. 5C, shows the High Temperature Shrinkage and High Temperature Thickness Expansion results from the panels made with core formulations Samples 10 to 17. These results show that using stucco B and the formulations Samples 10 to 17, the High Temperature Shrinkage and High Temperature Thickness Expansion results are materially unchanged with the addition in ATH. This is true even of the formulae with a stucco reduction that is the equivalent of about 100 lb/msf (see Samples 16 and 17).

Example 2C

In this example, a stucco (stucco C) prepared from relative low purity natural gypsum source (approximately 80% gypsum, the remainder clays and other impurities) was used to prepare the core formulations for Samples 18 through 20. The base core formulation was made using the following approximate amounts by weight: 1000 parts (Samples 18 and 20) or 975 parts (Sample 19) stucco C; 10 parts HRA; 10 parts pregelatinized starch; 2 parts sodium trimetaphosphate; 100 parts high expansion vermiculite (about 10% by weight of stucco); 5 parts glass fibers; 5 parts naphthalenesulfonate dispersant; 0 parts (Sample 18), and 25 parts (Samples 19 and 20) ATH (0% and 3% by weight of the stucco, respectively); and 1750 parts (Sample 18), 1725 parts (Sample 19), and 1700 parts (Sample 20) water.

Each of the core formulations Samples 18 through 20 were cast into panels and tested for High Temperature Thermal Insulation Index, High Temperature Shrinkage, and High Temperature Thickness Expansion. The cast and dried panels from each of the Sample formulations had the approximate values for density, high expansion vermiculite content, stucco, ATH, and TI reported in IVa and IVb, FIGS. 6A and 6B, respectively. Table IVa reports the difference between a core formulation, made using stucco C, with no ATH (Sample 18), and the TI values for the core formulations with about 3% ATH by weight of stucco, where the stucco C amount increased from the equivalent of about 1450 lb/msf (Sample 19) by to about 30 pounds to about 1480 lb/msf (Sample 20). Each of the formulations contained about 10% high expansion vermiculite by weight of stucco. Table IVb reports the density, high expansion vermiculite content, ATH % and the High Temperature Shrinkage and High Temperature Thickness Expansion results for the panels made from each of the core formulations Samples 18 to 20.

Table IVa shows the benefit of adding an amount of ATH (here about 3% by weight of the stucco) which is effective to increase the TI in panels made with those formulations by about one minute (compare Sample 18 to Samples 19 and 20). Table IVa also shows that the TI of the panels was not improved with addition of about 30 lb/msf of stucco C to the formulation (Sample 20), adding a significant amount of filler material (impurities) to the core. Table IVb shows that, in some formulations, the addition of about 3% ATH by weight of stucco preserve acceptable values for High Temperature Shrinkage (S), such as about 10% or less, and High Temperature Thickness Expansion, such as a positive expansion. In some instances, the addition of about 25 parts ATH by weigh to of stucco can improve the High Temperature Shrinkage (compare Sample 18 to Sample 19).

High Temperature Thermal Insulation Index Testing Pursuant to the Procedures Discussed in ASTM Pub. WK25392:

This procedure provides a simple, representative test of the high temperature thermal insulating characteristics of gypsum panels. The heat transfer conditions reflected in this test can be described by the energy equation for one dimensional unsteady heat conduction through the board thickness:

$$\Delta/\Delta x(k(\Delta T/\Delta x))+q=\rho c_p(\Delta T/\Delta t)$$

where T is the temperature at a given time t and depth x in the board. The thermal conductivity (k), density ($\rho$), and specific heat ($c_p$) are nonlinear temperature dependent functions at elevated temperatures. The heat generation rate q represents a variety of endothermic and exothermic reactions, e.g., gypsum phase changes and face paper combustion, which occur at different temperatures and, correspondingly, at different times.

For the purpose of evaluating the total heat conduction through the gypsum board and, hence its thermal insulating performance, it typically is not necessary to separately measure and describe each variable. It is sufficient to evaluate their net cumulative effect on heat transfer. For that purpose, the simple High Temperature Thermal Insulation Index test discussed in ASTM Pub. WK25392 was developed. "High Temperature Thermal Insulation Index" as used herein refers to a measure of the thermal insulation characteristics of gypsum panels under high temperature testing and sample conditions consistent with those described herein. Each test specimen consists of two 4 inch (100 mm) diameter disks clamped together by type G bugle head screws. A thermocouple is placed at the center of the specimen. The specimen then is mounted on edge in a rack designed to insure uniform heating over its surface and placed in a furnace pre-heated to about 930° F. (500° C.). The temperature rise at the center of the test specimen is recorded and a High Temperature Thermal Insulation Index, TI, computed as the time, in minutes, required for the test specimen to heat from about 105° F. (40° C.) to about 390° F. (200° C.). The High Temperature Thermal Insulation Index of the test specimen is calculated as:

$$TI=t_{200° C.}-t_{40° C.}$$

A temperature profile developed from data collected by this procedure often shows the transition from gypsum to hemihydrate at about 212° F. (100° C.) and the conversion of hemihydrate to the first anhydrite phase near about 285° F. (140° C.). Such data also often shows that once these phase transitions are completed, the temperature rises rapidly in a linear fashion as no further chemical or phase change reactions of significance typically occur below the oven temperature of about 930° F. (500° C.). By waiting until the specimen's core temperature has reached about 105° F. (40° C.) to begin timing, acceptable repeatability and reproducibility may be achieved.

A Test for Measuring "High Temperature Shrinkage" and "High Temperature Thickness Expansion" were Developed and Reported in ASTM Pub. WK25392:

In addition to core cohesion issues, shrinkage of the gypsum core due to exposure to high temperatures also contributes to the loss of physical integrity of an assembled panel structure, such as a wall unit and/or the fire barrier. A test for measuring "High Temperature Shrinkage" was developed and reported in ASTM Pub. WK25392 to provide a quantitative measure of the shrinkage characteristics of gypsum panels under high temperature conditions. This test procedure reflects the fact that the High Temperature Shrinkage that gypsum panels may experience under fire conditions is influenced by factors in addition to calcining reactions that may occur in the panel gypsum cores under high temperature conditions. The test protocol, accordingly, uses an unvented furnace so that there is no airflow from outside of the furnace that might cool the test specimens. The furnace temperature also is about 1560° F. (850° C.) to account for the shrinkage that may occur in the anhydrite phases of the gypsum core structures, as well as calcining and other high temperature effects, when exposed to the high temperatures fire conditions. "High Temperature Shrinkage" as used herein refers to a measure of the shrinkage characteristics of gypsum panels under high temperature testing and sample conditions consistent with those described herein. "High Temperature Thickness Expansion" as used herein refers to a measure of the thickness expansion characteristics of gypsum panels in the z-direction under high temperature testing and sample conditions consistent with those described herein.

The use of the terms "a" and "an" and "the" and similar referents in the context of describing the invention (especially in the context of the following embodiments) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Also, everywhere "comprising" (or its equivalent) is recited, the "comprising" is considered to incorporate "consisting essentially of" and "consisting of:" Thus, an embodiment "comprising" (an) element(s) supports embodiments "consisting essentially of" and "consisting of" the recited element(s). Everywhere "consisting essentially of" is recited is considered to incorporate "consisting of:" Thus, an embodiment "consisting essentially of" (an) element(s) supports embodiments "consisting of" the recited element(s). Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise stated. No language in the specification should be construed as indicating any element as essential to the practice of the invention unless otherwise stated.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the embodiments appended hereto as permitted by applicable law. Moreover, any combination of the above-described elements in all possible variations thereof is encompassed by the invention unless otherwise indicated herein or otherwise clearly contradicted by context.

The invention claimed is:

1. A gypsum product comprising:
a set gypsum core formed from at least water and stucco, wherein the stucco is selected from the group consisting of beta calcium sulfate hemihydrate, water-soluble calcium sulfate anhydrite, alpha calcium sulfate hemihydrate, and any mixture thereof, and aluminum trihydrate, with a portion of the stucco been omitted and replaced with the aluminum trihydrate and the aluminum trihydrate added in the amount from 2% to 10% by weight of the stucco; and wherein the ratio of the amount of added aluminum trihydrate to the amount of stucco omitted on the weight basis is about 1:1 to about 1:2, and at least partially covered by at least one paper cover sheet;
at least one of the paper cover sheets comprising paper formed from at least paper pulp mixed with aluminum trihydrate in the amount from about 5% to about 40% by weight of the paper pulp when dry; and
the gypsum product has a density of about 27 lb/ft$^3$ (about 430 kg/m$^3$) to about 37 lb/ft$^3$ (about 590 kg/m$^3$) and a High Temperature Thermal Insulation Index of greater than about 17 minutes, the High Temperature Thermal Insulation Index determined according to ASTM Publication WK25392.

2. The gypsum product of claim 1, wherein the gypsum product is a gypsum panel, and the set gypsum core is disposed between two paper cover sheets.

3. The gypsum product of claim 1, wherein the aluminum trihydrate is present in an amount effective to increase the High Temperature Thermal Insulation Index of the gypsum product relative to the High Temperature Thermal Insulation Index of the gypsum product without the aluminum trihydrate.

4. The gypsum product of claim 1, wherein the paper comprises at least a partial coating of aluminum trihydrate.

5. The gypsum product of claim 1, wherein the paper further comprises magnesium hydroxide.

6. The gypsum product of claim 2, wherein the set gypsum core comprises a gypsum crystal matrix, and the panel having a density of about 35 pcf (about 560 kg/m$^3$) or less.

7. An assembly of at least two gypsum panels and each gypsum panel comprises a set gypsum core disposed between two paper cover sheets,
the set gypsum core formed from at least water, stucco, wherein the stucco is selected from the group consisting of beta calcium sulfate hemihydrate, water-soluble calcium sulfate anhydrite, alpha calcium sulfate hemihydrate, and any mixture thereof, and aluminum trihydrate, with a portion of the stucco has been replaced with the aluminum trihydrate and the aluminum trihydrate present in the amount from 2% to 10% by weight of the stucco, and wherein the ratio of the amount of added aluminum trihydrate to the amount of stucco omitted on the weight basis is about 1:1 to about 1:2, and
the panel having a density of about 27 lb/fit$^3$ (about 430 kg/m$^3$) to about 37 lb/ft$^3$ (about 590 kg/m$^3$), and the panel effective to inhibit the transmission of heat through the assembly of said panels prepared pursuant to UL U419 procedures wherein one surface is exposed to a heat source and an opposite unheated surface includes a plurality of sensors applied thereto such that the maximum single sensor temperature on the unheated surface is less than about 415° F. at about 30 minutes elapsed time when measured pursuant to UL U419, the heat source following a time-temperature curve in accordance with ASTM standard E119-09a, and the sensors arrayed in a pattern in accordance with UL U419 procedures.

8. The assembly of claim 7, wherein at least one paper cover sheet is paper formed from at least paper pulp mixed with aluminum trihydrate.

9. The assembly of claim 7, wherein the paper cover sheet comprises at least a partial coating of aluminum trihydrate.

10. The assembly of claim 7, wherein the assembly comprises insulation between said panels.

* * * * *